United States Patent
Kataoka et al.

(10) Patent No.: US 6,313,564 B1
(45) Date of Patent: Nov. 6, 2001

(54) DRIVING APPARATUS FOR VIBRATION TYPE ACTUATOR APPARATUS

(75) Inventors: Kenichi Kataoka; Shinji Yamamoto; Tadashi Hayashi; Jun Ito, all of Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/207,917

(22) Filed: Dec. 9, 1998

(30) Foreign Application Priority Data

Dec. 12, 1997 (JP) .................................................. 9-343453

(51) Int. Cl.[7] ...................................................... H02N 2/00
(52) U.S. Cl. .......................................................... 310/316.01
(58) Field of Search ............................ 310/316.01, 316.02, 310/348

(56) References Cited

U.S. PATENT DOCUMENTS

| | | | |
|---|---|---|---|
| 4,672,256 | * 6/1987 | Okuno et al. | 310/323 |
| 5,001,404 | 3/1991 | Kataoka | 318/116 |
| 5,004,964 | 4/1991 | Kataoka | 318/128 |
| 5,034,646 | 7/1991 | Shirasaki | 310/323 |
| 5,157,300 | 10/1992 | Kataoka | 310/323 |
| 5,285,134 | 2/1994 | Kataoka | 318/116 |
| 5,436,521 | 7/1995 | Kataoka | 310/317 |
| 5,459,370 | 10/1995 | Kataoka | 310/317 |
| 5,539,268 | 7/1996 | Kataoka | 310/316 |
| 5,631,516 | 5/1997 | Kataoka | 310/316 |
| 5,889,350 | 3/1999 | Yamamoto | 310/316 |
| 5,952,766 | * 9/1999 | Mukohjima et al. | 310/323.04 |

FOREIGN PATENT DOCUMENTS

| | | | |
|---|---|---|---|
| 0 693 821 | 1/1996 | (EP) | H02N/2/14 |
| 61-39871 | * 2/1986 | (JP) | 310/316.01 |
| 61-207186 | 9/1986 | (JP) | H02N/2/00 |
| 2-111274 | 4/1990 | (JP) | H02N/2/00 |
| 2-151284 | 6/1990 | (JP) | H02N/2/00 |
| 6-90573 | * 3/1994 | (JP) | 310/316.01 |
| 7-59368 | 3/1995 | (JP) | H02N/2/00 |
| 10-21-773 | * 7/1998 | (JP) | H02N/2/00 |
| 63-174580 | * 7/1998 | (JP) | H02N/2/00 |

* cited by examiner

Primary Examiner—Thomas M. Dougherty
(74) Attorney, Agent, or Firm—Fitzpatrick, Cella, Harper & Scinto

(57) ABSTRACT

A driving apparatus is provided with an evaluating device for evaluating a wear state in a friction surface between a vibration member and a movable member in a vibration type actuator apparatus.

The evaluating device accurately and automatically evaluating the wear state of the friction surface by detecting a fluctuation amount of a driving speed under driving conditions of the vibration type actuator apparatus selected so as to achieve a fixed speed.

56 Claims, 19 Drawing Sheets

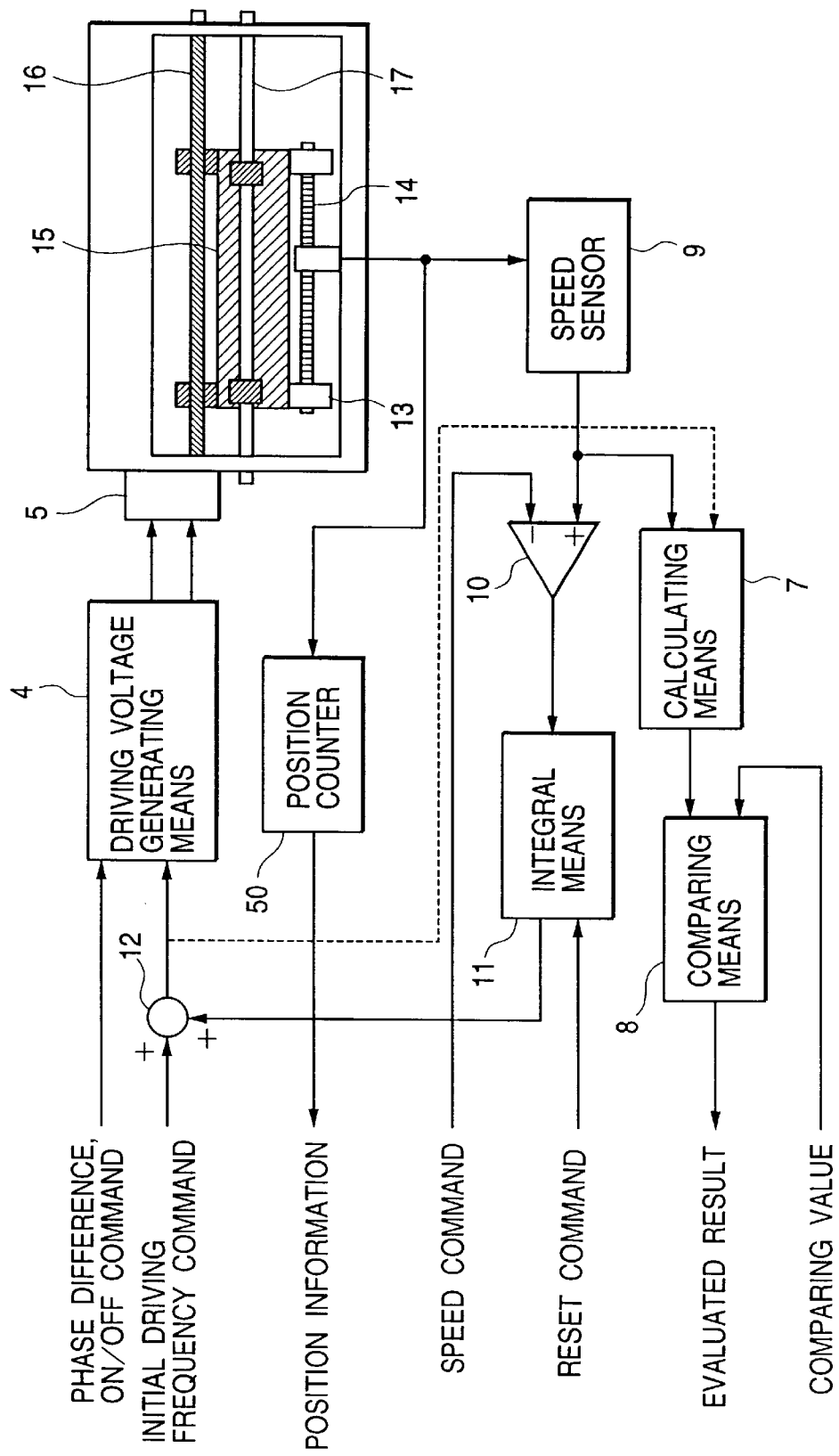

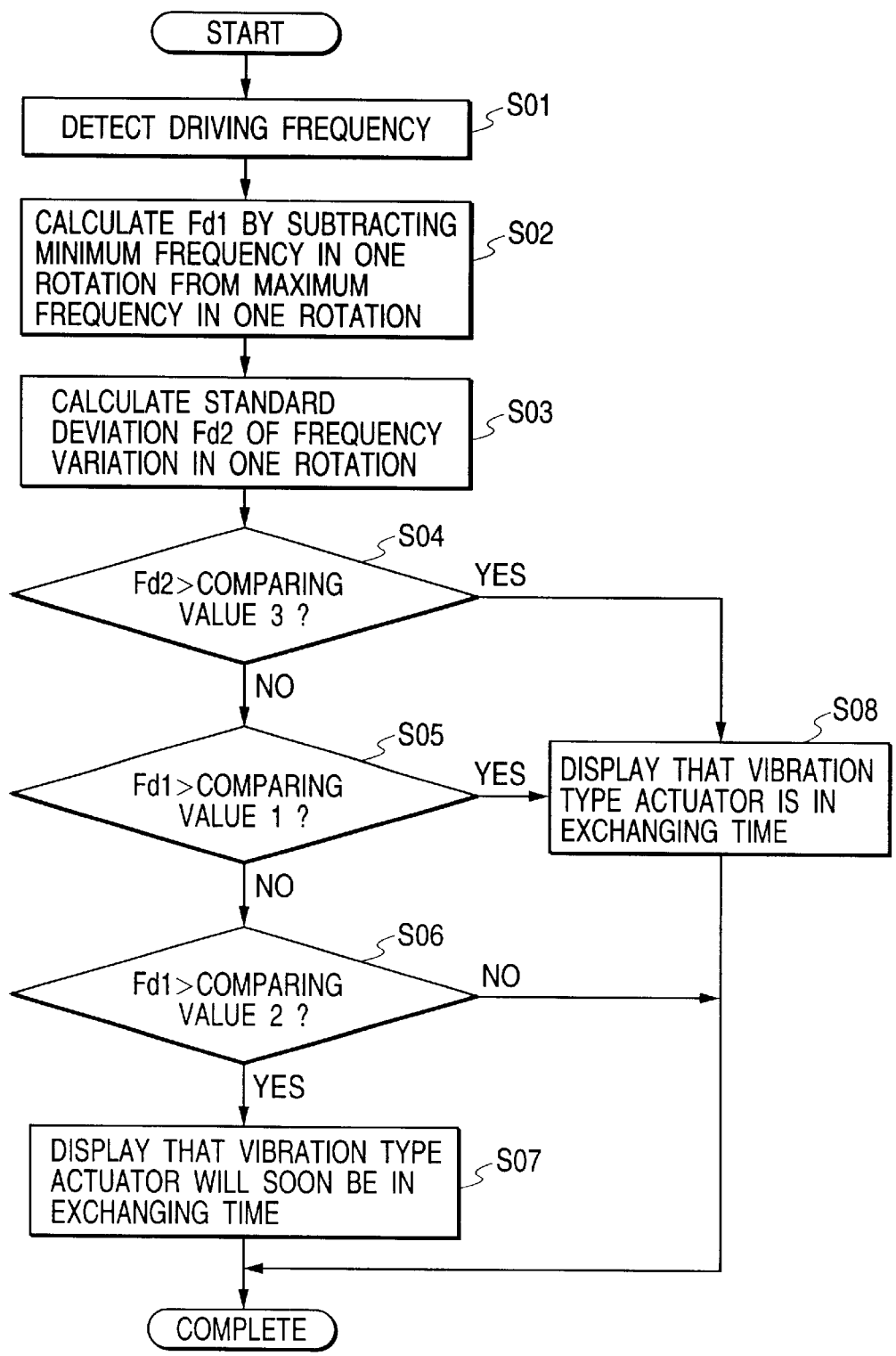

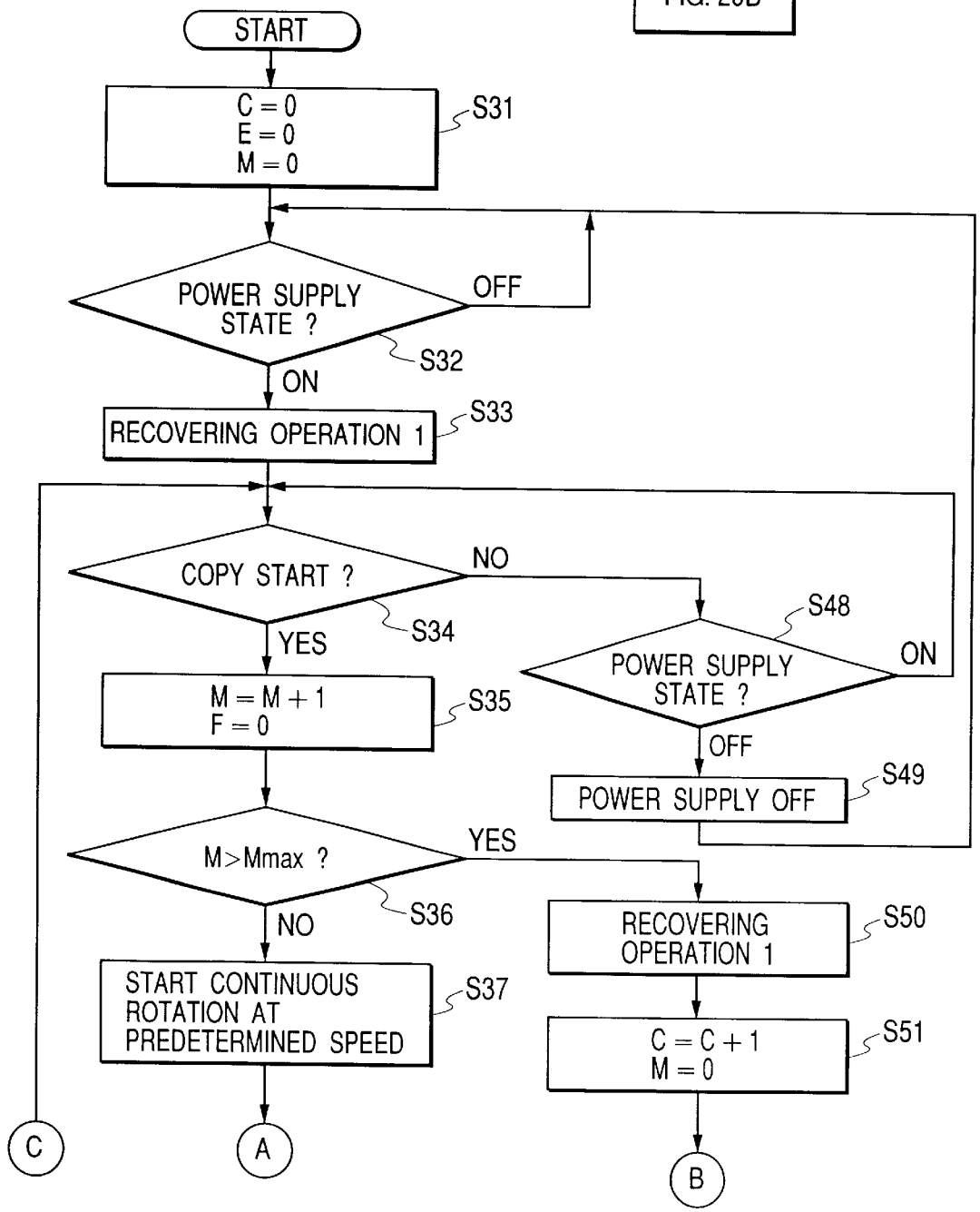

DRIVING APPARATUS FOR VIBRATION TYPE ACTUATOR APPARATUS

BACKGROUND OF THE INVENTION

1. Field of the Invention

The present invention relates to a determination method for evaluating a friction surface of a vibration type actuator, a vibration type driving apparatus, a vibration type actuator, a vibration type actuator apparatus, a copying machine, and the like.

2. Related Background Art

In conventional vibration type actuators, a vibration member is adapted to form a driving vibration wave in an elastic member by applying alternating signals to a an electro-mechanical energy conversion element (such as a piezoelectric element) of the actuator. A contact member is provided in press contact with a driving surface of the vibration member, and the contact member is frictionally driven relative to the vibration member by the driving vibration wave. A friction member is provided on one of the frictional slide surfaces, for example, on the driving surface of the elastic member. This friction member wears off as a result of friction caused by sliding against the opposing member during driving of the vibration type actuator, and powder resulting from wear sticks to the frictional slide surface, thereby affecting the frictional driving.

An approach for recovering the friction surface is described in Japanese Patent Application Laid-Open No. 61-207186, wherein a member for removing wear particles stuck to the friction surface is provided in direct contact with the friction surface to shave off wear particles adhered thereto.

Japanese Patent Application Laid-Open No. 7-59368 suggests another approach for recovering the friction surface using a friction material containing abrasive grains to remove wear particles stuck to the frictional slide surface.

SUMMARY OF THE INVENTION

One aspect of the present invention is to provide a vibration type driving apparatus adapted to automatically evaluate a condition of a friction surface between a vibration member and a contact member of a vibration type actuator by detecting a variation amount of an output state of the driving speed, or the like, of the actuator.

One aspect of the present invention is to provide a vibration type driving apparatus that can perform a recovery operation when the condition of a friction surface between the vibration member and the contact member of the vibration type actuator deteriorates.

One aspect of the present invention is to provide an image forming apparatus, such as a copying machine, using a plurality of vibration type actuators as driving sources, wherein when any one of the actuators shows deterioration of the condition of a friction surface, a recovery operation is carried out for each actuator.

One aspect of the present invention is to provide an apparatus for evaluating the condition of a friction surface, based on the fact that the resonant frequency of the vibration type actuator varies with a change in the condition of the friction surface. For example, the apparatus may detect a parameter that indirectly changes with a change in the resonant frequency, arithmetically process detected values to compute a change of the parameter, and compare an output of the computation result with a predetermined threshold.

One aspect of the present invention is to provide an apparatus including evaluating means for evaluating a condition of a friction surface of a vibration type actuator, determining means for determining whether a recovery operation of the friction surface should be carried out, based on the evaluation result, and notifying means for notifying a user that a recovery operation needs to be carried out, based on the determination result.

One aspect of the present invention is to provide a vibration type actuator apparatus that obtains a driving force by vibrating a vibration member, where the apparatus is provided with evaluating means for evaluating a change of a speed condition of the actuator apparatus during driving of the actuator apparatus under a predetermined driving condition, wherein a condition of a contact surface between a vibration member and a contact member in contact with the vibration member is determined based upon a determination of whether the speed condition exceeds a predetermined range of fluctuation.

One aspect of the present invention is to provide a vibration type actuator apparatus that obtains a driving force by applying a cyclic signal to an electro-mechanical energy conversion element so as to generate vibration in a vibration member, where the apparatus is provided with evaluating means for evaluating a condition of a contact surface between the vibration member and a contact member in contact with the vibration member, and contact surface recovery means for recovering a condition of the contact surface by (i) setting a relative movement speed between the vibration member and the contact member at a high speed, (ii) by driving the actuator apparatus at high speed, or (iii) by repetitively operating the actuator apparatus in forward and backward directions, when the evaluating means determines that the condition of the contact surface is unacceptable.

Other objects of the present invention will become more apparent from the following description of the preferred embodiments together with the accompanying drawings.

BRIEF DESCRIPTION OF THE DRAWINGS

FIG. 9 is a block diagram illustrating a second embodiment of the present invention;

FIG. 10 is a flowchart illustrating operation of the evaluating means of FIG. 9;

FIG. 20, which comprises FIGS. 20A and 20B, is a flowchart explaining the operation of the embodiment of FIG. 19;

DESCRIPTION OF THE PREFERRED EMBODIMENTS (First Embodiment)

Figure 1:
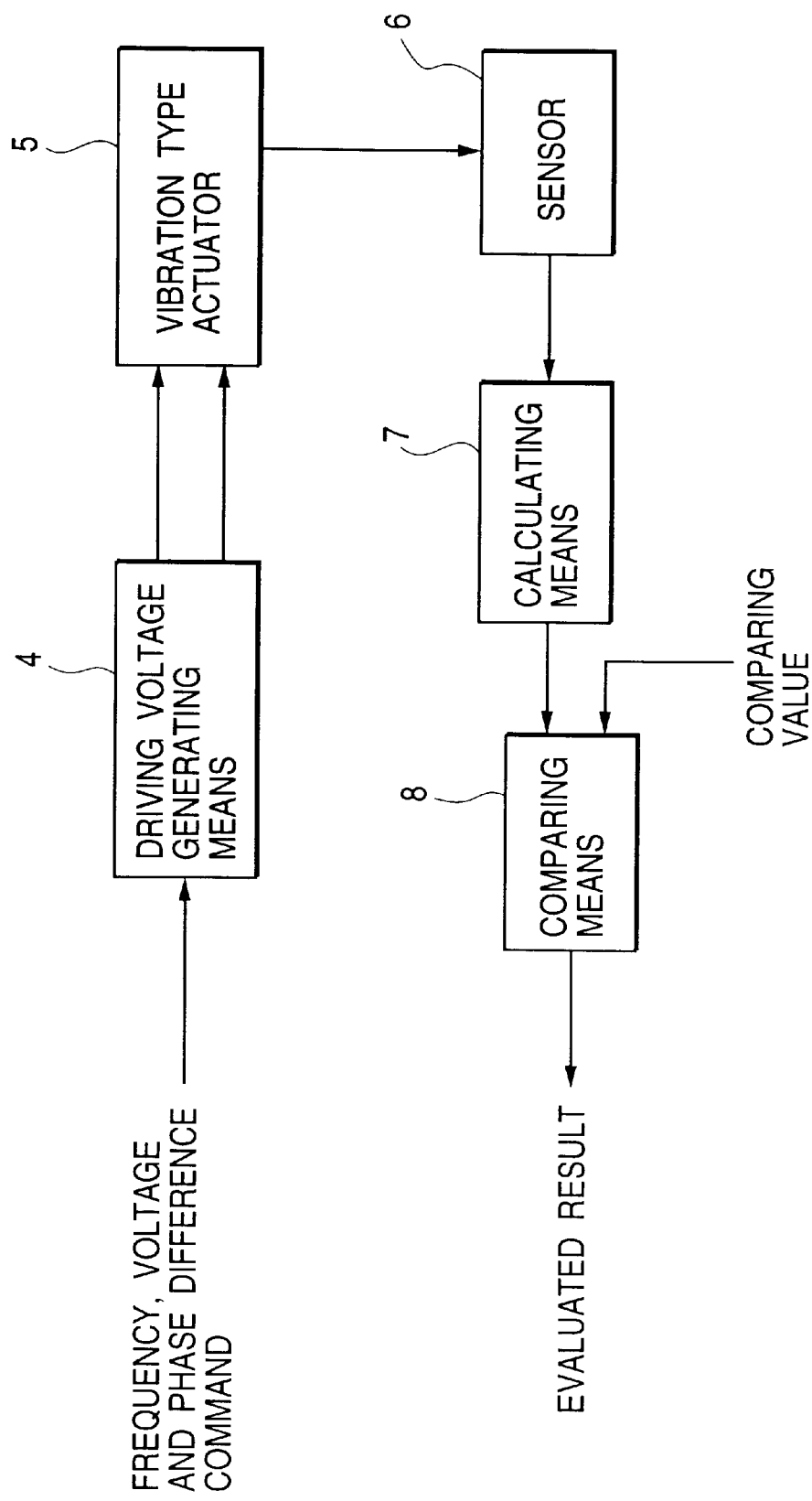
FIG. 1 is a block diagram illustrating a first embodiment of the present invention.
Figure 2:
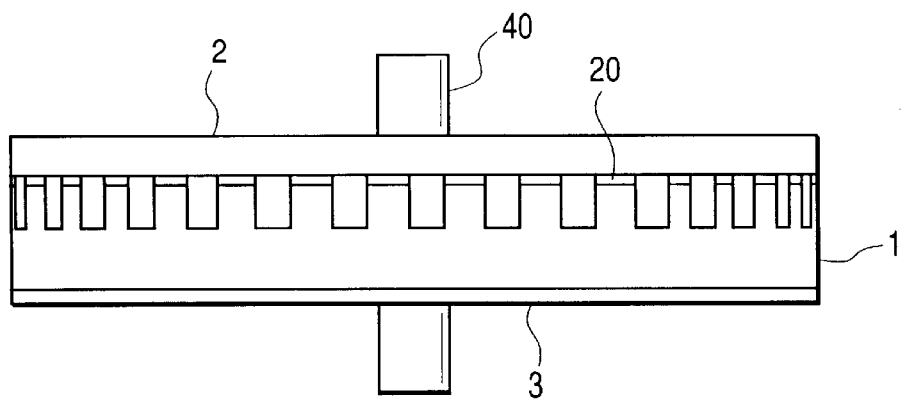
FIG. 2 is a side view of a vibration type actuator.

FIG. 1 is a block diagram illustrating a first embodiment of the present invention and FIG. 2 is a structural diagram illustrating an example of an actuator of a circular ring shape, which is one type of vibration actuator. First, the actuator will be described briefly.

Figure 3:
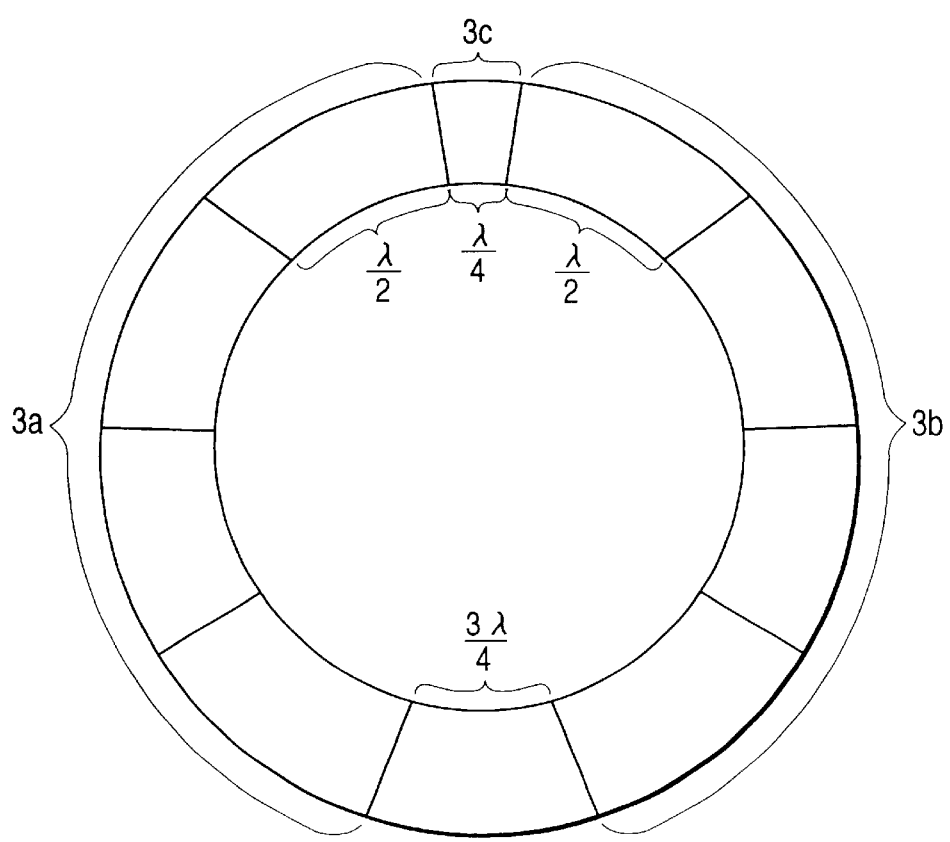
FIG. 3 is a plan view illustrating an electrode arrangement of a piezoelectric member in the vibration member of FIG. 2.

In FIG. 2, a vibration member 1 includes a piezoelectric element (an electro-mechanical energy conversion element) 3 bonded to one surface of a ring-shaped elastic member 1a. A rotor (a contact member) 2 maintained in press contact with the vibration member 1 by pressing means (not shown). A friction member 20 is bonded to the vibration member 1 and interposed between the vibration member 1 and the rotor 2. A rotational shaft 40 is connected to the center of the rotor 2. The surface of the piezoelectric member 3 is partitioned into a plurality of electrodes in the shape illustrated in FIG. 3.

These electrodes consist of two driving electrode groups 3a, 3b and one sensor electrode portion 3c. In the following description, the driving electrode group 3a will be referred to as the A-phase, the driving electrode group 3b as the B-phase, and the sensor electrode portion 3c as the S-phase. The vibration type actuator illustrated in FIG. 2 provides a structure in which a travelling vibration wave is generated in the vibration member 1 by applying respective alternating voltages having a temporal phase difference of 90° therebetween to the A-phase and B-phase electrodes, and a frictional driving force of this vibration is transmitted to the rotor 2 maintained in press contact therewith via the friction member 20 and the vibration member 1, so as to rotate the rotor 2.

As described above, the vibration type actuator achieves rotation of the rotor 2 relative to the vibration member 1 by application of the two alternating voltages.

Now, FIG. 1 will be described. Driving voltage generating means 4 is provided for applying two alternating voltage signals to a vibration type actuator 5, based on commands from frequency, voltage, and phase difference command means (not illustrated). A sensor 6, such as an encoder, is provided for detecting rotation of the vibration type actuator 5, and calculating means 7 is provided for obtaining values such as maximun, minimum, average, variance, standard deviation values, etc., every fixed time from the output from sensor 6, and for performing an arithmetic operation in combination with one or more of these values. Comparing means 8 is provided for comparing the result of the arithmetic operation with a comparing value and for outputting the result to determining means (not illustrated).

The principal objective of the calculating means 7 is an arithmetic operation for digitizing a fluctuation width of the output from the sensor 6; for example, the calculating means 7 digitizes fluctuations of the output from the sensor 6 by a method of sampling the output from the sensor 6 a predetermined number of times within a certain period of time every fixed time under constant driving conditions of fixed frequency, voltage, and phase difference, and calculating a difference by subtracting the minimum or average from the maximum, or by calculating the variance or standard deviation.

The vibration type actuator 5 is characterized in that its performance varies depending upon the wear condition of the contact portion due to frictional driving. Therefore, long-term use of the actuator will result in a gradual increase in fluctuations of rotation, so that the actuator may fail to satisfy required performance criteria in certain cases. In such cases it becomes necessary to exchange the vibration type actuator 5 or to refresh (recover) the friction surface. In the present embodiment the calculating means calculates a fluctuation value of speed under constant driving conditions, as detected by the sensor 6, and the determining means (not shown) determines that the friction surface is worn out when output of the comparing means 8 indicates that the fluctuation value is greater than a predetermined value (the comparing value).

Figure 4:
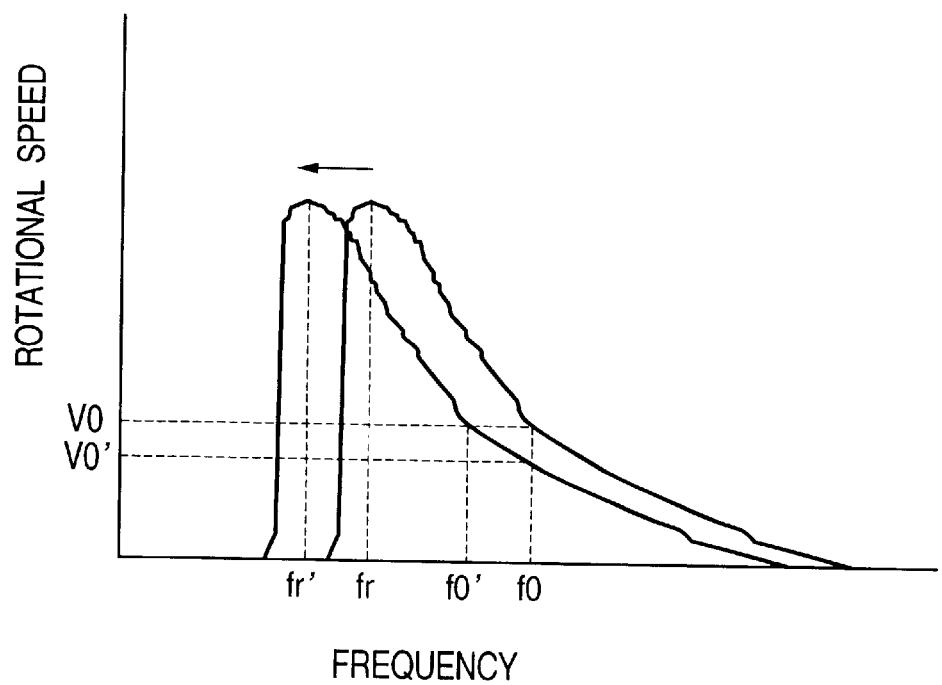
FIG. 4 is a diagram illustrating the relation of rotational speed to driving frequency of the vibration type actuator.
Figure 5:
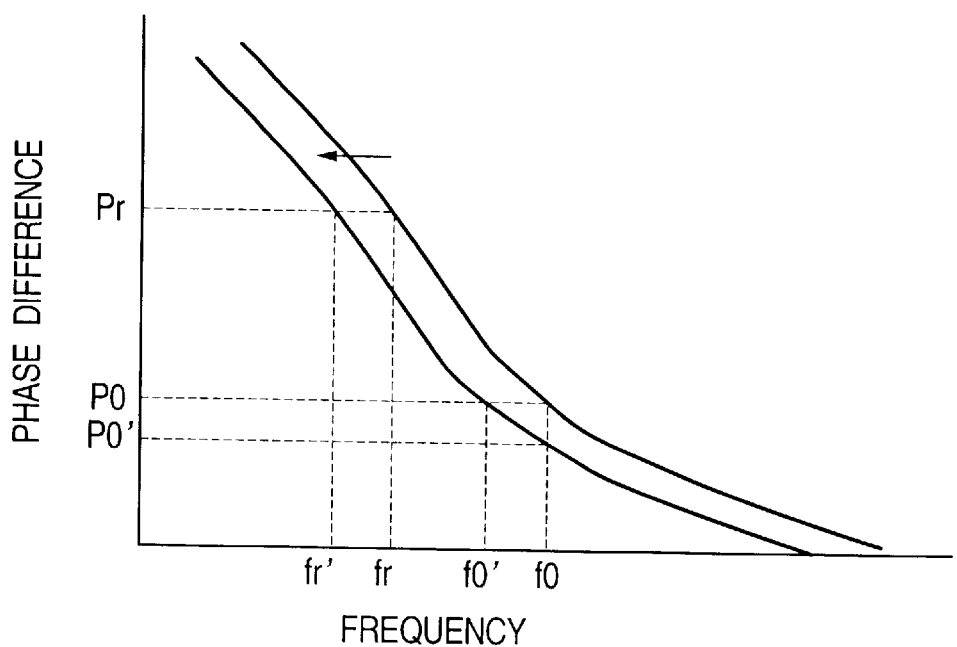
FIG. 5 is a diagram illustrating the relation of phase difference between an applied voltage and an S-phase output to driving frequency of the vibration type actuator.
Figure 6:
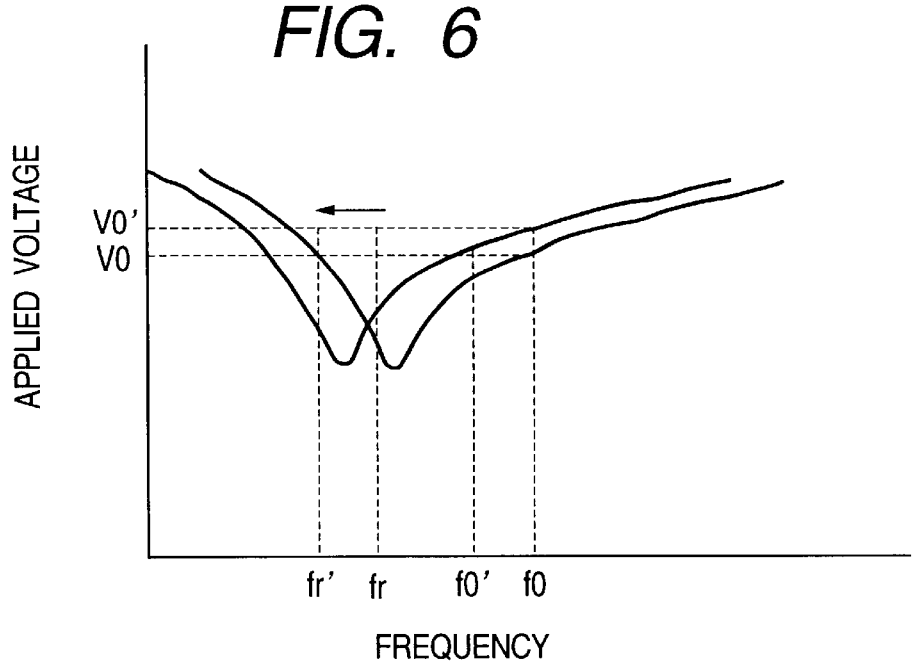
FIG. 6 is a diagram illustrating the relation of applied voltage to the driving frequency of the vibration type actuator.

The present embodiment provides the apparatus with detecting means for detecting degradation of the performance of the vibration type actuator 5. Although in the above embodiment the sensor 6 detects the speed, other parameters may be used for detecting the degradation of performance of the vibration type actuator 5. FIG. 4, FIG. 5, and FIG. 6 are illustrations for explaining such parameters.

Prior to describing these figures, let us briefly describe what changes take place in the vibration type actuator 5 as wear of the friction surface progresses.

Many vibration type actuators are driven by applying voltage signal(s) near the resonant frequency of the vibration member 1. This is because a driving frequency near the resonant frequency of the vibration member 1 decreases the magnitude of the applied voltage required for obtaining the same vibration amplitude, and therefor provides efficient operation of the vibration type actuator 5.

Accordingly, the closer the driving frequency is to the resonant frequency, the greater the vibration amplitude becomes using the same applied voltage; therefore, the driving speed also becomes higher. This resonant frequency, however, varies depending upon the surface condition of the friction surface and the temperature, and this variation causes various performance changes.

First, FIG. 4 will be described. FIG. 4 shows the relation of operational speed to driving frequency when the actuator is driven by signals having a constant voltage.

Many vibration type actuators have asymmetric vibration response characteristics, as illustrated, and the driving speed is controlled, normally, by selectively changing the frequency or voltage of the applied signal having a driving frequency in a frequency region higher than the resonant frequency. In the diagram, fr indicates the resonant frequency of the vibration member 1 at a certain moment and fr' indicates the resonant frequency after slight rotation of the rotor 2, which changes the positional relation between the vibration member 1 and rotor 2.

Experiments demonstrate that the difference between fr and fr' is small when the friction surface is in good condition, but the difference becomes greater as the condition of the friction surface deteriorates. Here, let us define the driving frequency as f0. Then, the operational speed is V0 in the initial state but changes to V0' when the resonant frequency changes. It is thus seen from this figure that a change in the operational speed becomes greater as the change in the resonant frequency becomes greater, i.e., with degradation of the condition of the friction surface.

Another example of means for determining the change in the resonant frequency is by using the phase difference, as illustrated in FIG. 5. This phase difference indicates a temporal phase difference between the applied voltage (cyclic signal) and a signal representing the vibration state of the vibration member 1. Let Pr represent the phase difference when the driving frequency is the resonant frequency of the vibration member 1. In the case where the vibration member 1 is driven at the predetermined frequency f0, a change in the resonant frequency from fr to fr' will cause a change from P0 to P0' of the temporal phase difference between the applied voltage and the vibration of the vibration member 1.

Since the magnitude of this phase difference change depends upon the change of the resonant frequency of the vibration member 1, the degree of the change of the resonant frequency can be detected, in a fashion similar to the fashion used to detect the speed change described above, from the result of detection of the phase difference every fixed time during driving under constant driving conditions. A specific configuration for detecting this phase difference employs a method for providing the vibration member with a piezoelectric member (sensor) and for detecting the phase difference between the output of this piezoelectric member and the driving cycle signal.

Figure 7:
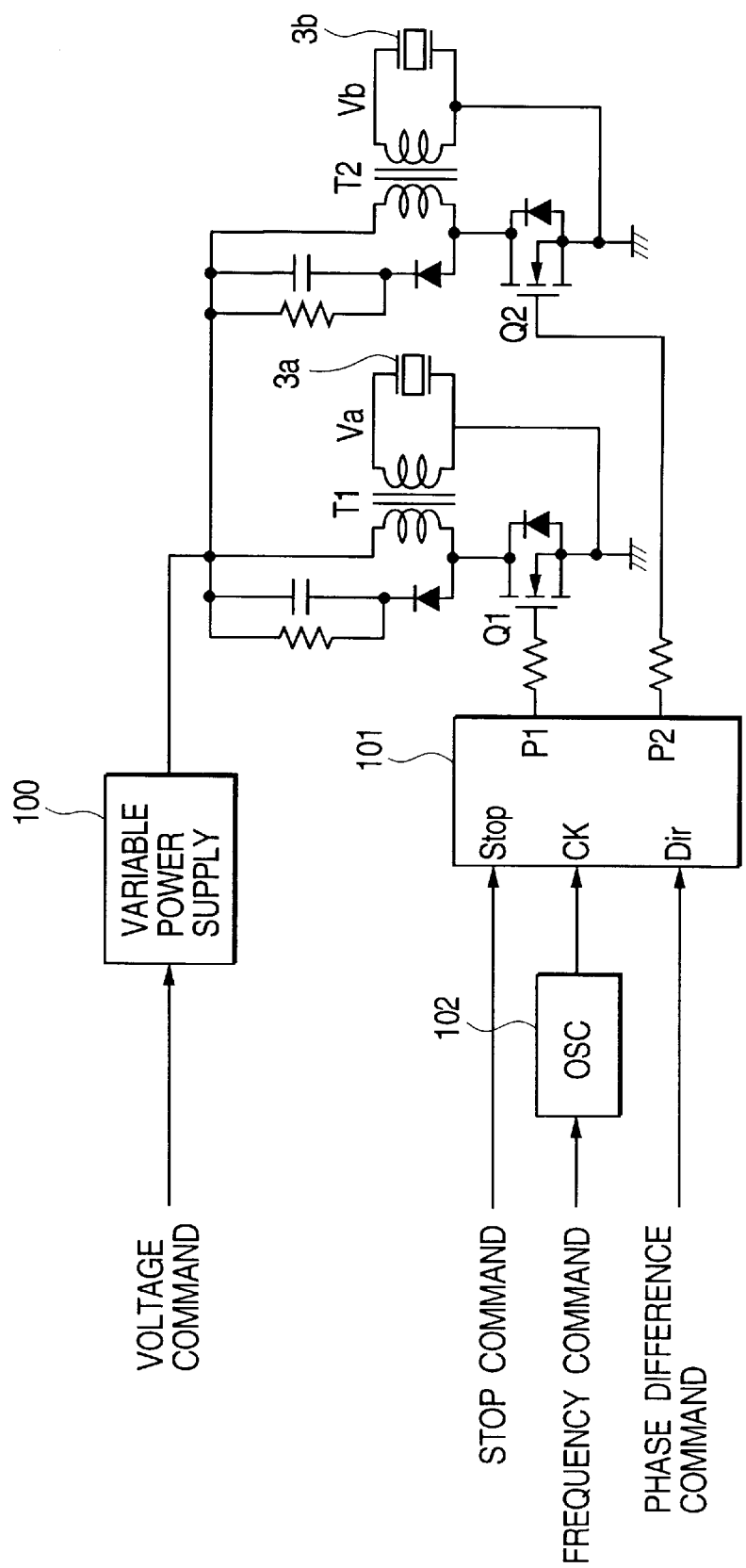
FIG. 7 is a circuit diagram illustrating a circuit example of driving voltage generating means.

FIG. 7 illustrates an exemplary circuit of the driving voltage generating means. Each of the driving electrode groups 3a, 3b of the piezoelectric member 3 is connected to the secondary winding of a transformer T1 or T2, respectively; MOSFET Q1 or Q2 and a variable power supply 100 for varying the output voltage according to a voltage command from command means (not shown) are connected to the primary winding of each transformer. By changing the output power of the variable power supply 100 connected to the primary windings of the transformers, the amplitude of the voltages applied to the electrode groups 3a, 3b are varied.

Pulse signals of two phases having a temporal phase shift of 90° from each other are supplied from pulse generating section 101, and applied to gate terminals of respective MOSFETs Q1, Q2. When the current on the primary winding side of the transformers T1, T2 is turned on and off, boosted alternating voltage signals appear on the secondary winding side of the transformers.

An oscillator 102 is connected to the pulse generating section 101 and the frequency of output pulses from the oscillator 102 is set according to a frequency command from command means (not shown). The output pulses from the pulse generating section 101 thus change according to the output frequency of the oscillator 102.

Figure 8:
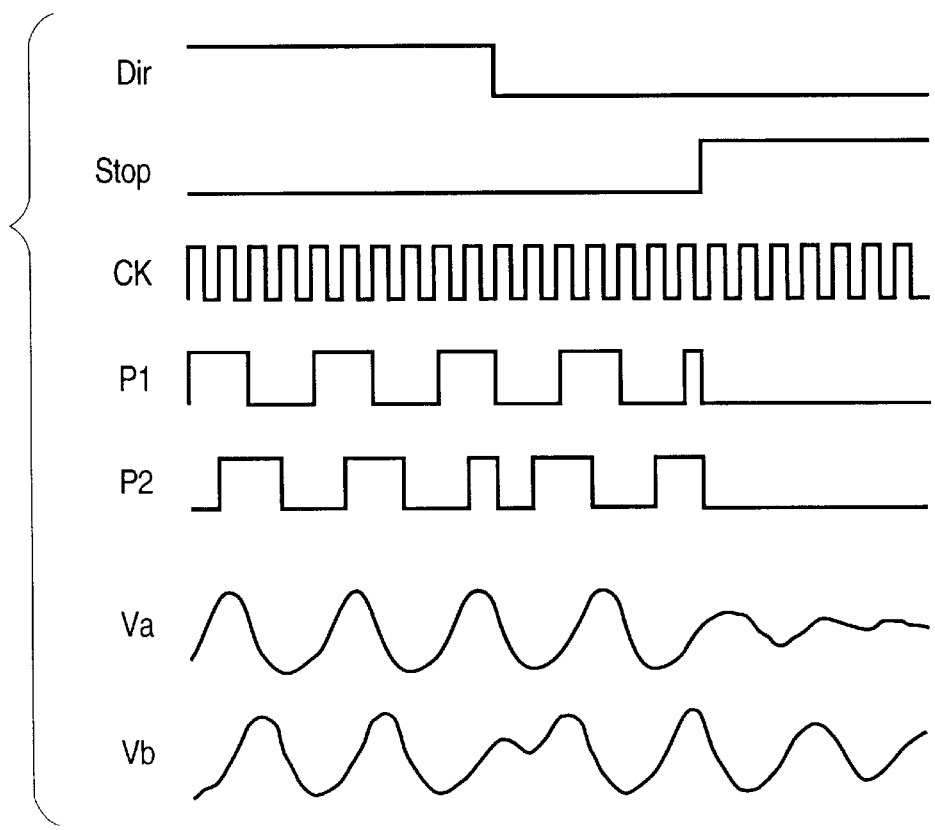
FIG. 8 is a diagram illustrating waveforms at respective positions of FIG. 7.

Waveforms at the respective sections are illustrated in FIG. 8. In FIG. 8, Dir represents a rotation direction signal, Stop represents a stop signal, P1, P2 respectively represent the output signals at the output terminals of the pulse generating section 101, and Va, Vb represent cyclic voltage signals. Since the impedance of the piezoelectric member 3 varies in accordance with variation in the driving frequency, the impedance of the electrode groups 3a, 3b also varies. Based on this influence, the amplitude of the voltage signals on the secondary winding side of the transformers T1, T2 varies in accordance with the driving frequency. This phenomenon is, for example, as illustrated in FIG. 6.

As illustrated, supposing the resonant frequency changes from fr to fr', for example, when the driving frequency is f0, the driving voltage (Va or Vb of FIG. 7) will change from V0 to V0'. Therefore, this change of the driving voltage is detected to detect the degree of the change of the resonant frequency during rotation of the vibration type actuator 5. In this way the condition of the friction surface can be evaluated by evaluating this degree according to predetermined criteria for evaluation.

Accordingly, the condition of the friction surface can be evaluated using voltage detection, in a fashion similar to the fashion in which the condition of the friction surface was evaluated using speed detection, by detecting the change of the voltage at intervals of fixed time.

(Second Embodiment)

FIG. 9 is a block diagram illustrating the second embodiment of the present invention.

In FIG. 9, a lead screw 16 is directly connected to the rotational shaft of the vibration type actuator 5. A stage 15 adapted to move in the axial direction of the lead screw 16 according to an angle of rotation thereof when the lead screw 16 is rotated by the vibration type actuator 5. A guide 17 is provided for assisting the movement of the stage 15. A scale 14 is graduated for detecting an amount of the movement of the stage 15. A reader 13 is provided for converting a detected graduation of the scale 14 to an electric signal. A speed sensor 9 is provided for detecting the moving speed of the stage 15 from the number of graduations detected within a certain time or from time periods between detected graduations successively read from the output of the reader 13, and a position counter 50 is provided for detecting the position of the stage 16.

A differential amplifier 10 compares the output from the speed sensor 9 with the speed command from command means (not shown), and outputs an amplified output. Integral means 11 is provided for resetting an integral value in response to a reset command from the command means (not shown), and for integrating the output of the differential amplifier 10, and adding means 12 is provided for adding an initial driving frequency command from the command means (not shown) to the output of the integral means 11. The output of the adding means 12 determines the frequency of the output voltages of the driving voltage generating means 4.

The first embodiment employs a fixed frequency command, voltage command, and phase difference command from command means (not shown) to the driving voltage generating means 4, whereas the present embodiment employs a variable driving frequency so as to equalize the output of the speed sensor 9 and the speed command.

Operation of the second embodiment now will be described. When the output of the speed sensor 9 is larger than the speed command, the output of the differential amplifier 10 is a positive value and the output of the integral means 11 increases. Then, the output of the adding means 12 is the sum of the initial driving frequency command and the output of the integral means 11, so as to increase the input to the driving voltage generating means 4, thus increasing the driving frequency.

This results in decreasing the speed, as is apparent from the characteristic curve of speed to frequency of FIG. 4. This decreases the output of the speed sensor 9, so that the output of the speed sensor 9 becomes equal to the speed command.

When the output of the position counter 50 becomes coincident with a target position, the command means (not shown) issues an "off" order to the driving voltage generating means 4 by an on/off command. When the output is over the target position, the moving direction is reversed by switching the phase difference command to 90° or −90°. The command means (not shown) is configured so as to output an integral reset command to the integral means 11 upon start-up and the driving frequency upon start-up is determined by the initial driving frequency command.

Let us suppose herein that the vibration type actuator 5 is rotating at a fixed speed according to the speed command. Without any change in the resonant frequency of the vibration type actuator 5, the driving frequency is also kept substantially constant. Once variations of the resonant frequency become large because of progress in the wear of the friction surface of the vibration type actuator 5, however, the driving frequency is changed in order to achieve rotation at the same speed. Since fluctuations of speed cannot be controlled perfectly to zero, the condition of the friction surface can be detected indirectly by detecting the output of the speed sensor 9 by the calculating means 7.

In the configuration of FIG. 9 the fluctuations of speed are detected from the output of the speed sensor 9 in a fashion similar to the fashion in the embodiment of FIG. 1. At this time the change of the condition of the friction surface will also change the speed fluctuation amount, but the fluctuation amount is small because of the control of the speed.

If the calculating means 7 is arranged so as to detect the degree of fluctuations of the output from the adding means 12 or fluctuations of the input or output of the integral means 11, the condition of the friction surface can be judged more accurately, because the degree of such fluctuations is greater than the fluctuation width of the output signal from the speed sensor 9. The apparatus is thus configured so as to evaluate whether the condition of the friction surface indicates that an exchange time is approaching, how long the remaining lifetime is, etc., by comparing the output from the calculating means 7 with at least one predetermined value ("comparing value") in the comparing means 8 and the evaluated result.

Figure 23:
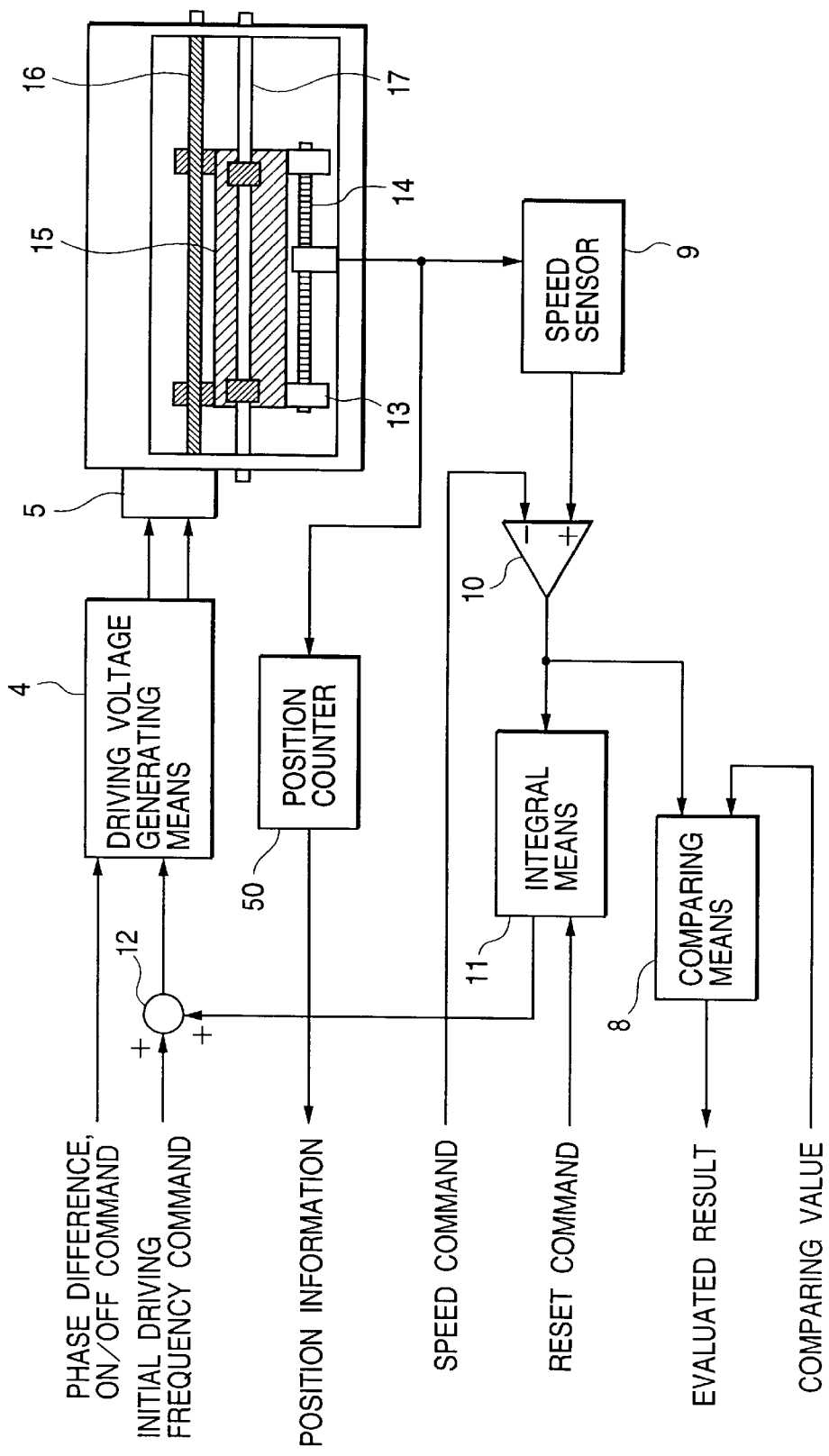
FIG. 23 is a block diagram illustrating a modification of the second embodiment.

The apparatus may also be configured without the calculating means, as illustrated in FIG. 23.

Figure 11:
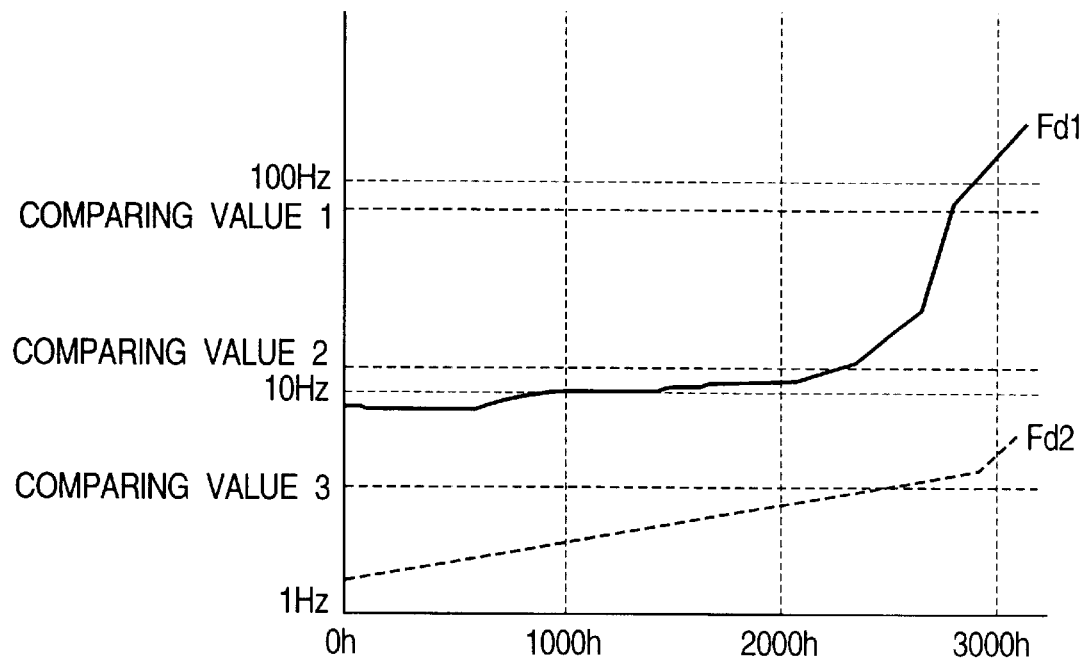
FIG. 11 is a diagram illustrating the relation of fluctuation width of resonant frequency to operational time of the vibration type actuator.

FIG. 10 is a flowchart illustrating evaluation procedures of the calculating means 7 and comparing means 8 in a structure for detecting the fluctuations of the driving frequency, instead of detecting fluctuations of speed from a speed sensor. FIG. 11 is a graph illustrating an example of the relation between degrees of change of driving frequency and cumulative rotation time of the vibration type actuator 5. It is seen from this figure that degradation of degrees of frequency fluctuations is accelerated in range over the time of 2000 (h).

In FIG. 11, the curve indicated by the solid line plots the difference between maximum and minimum of driving frequency during one rotation of the vibration type actuator 5, which will be referred to hereinafter as P—P values (Fd1), and the curve indicated by the dashed line plots the standard deviation values (Fd2) of driving frequency values at respective rotational positions numbering 100 points in one rotation. Comparing value 3 is compared with the standard deviation values Fd2 and comparing values 1, 2 are compared with the P—P values (Fd1).

The evaluation procedures of the evaluating means will be described using the flowchart of FIG. 10.

In this case, the apparatus is configured so as to input the driving frequency command to the calculating means 7, as indicated by the dotted line of FIG. 9, and the functions of the calculating means 7 and comparing means 8 are implemented by software processing in a microcomputer.

After the operation of this flowchart is started, the driving frequency is detected (S01), and first calculated are the P—P value (Fd1) and the standard deviation (Fd2) of the driving frequency during one rotation of the vibration type actuator 5 (detected by the sensor 9) (S02, S03).

Then the standard deviation (Fd2) is compared with the comparing value 3 (S04). If the standard deviation is greater, a display means not illustrated displays an indication to indicate that an exchange time of the vibration type actuator 5 is approaching (S08). Then the operation of this flowchart is terminated.

On the other hand, if the standard deviation is smaller than the comparing value 3 in S04, the P—P value (Fd1) is compared with comparing value 1 (S05). When the P—P value is greater than the comparing value 1, the display means (not shown) displays an indication that the exchange time of the vibration type actuator 5 is approaching (S08). Then the operation of this flowchart is completed. Otherwise, the P—P value is compared with comparing value 2 (S06). If the P—P value is greater, the display means displays an indication that indicates the device is in close proximity to the exchange time (S07). If smaller, the evaluation operation will be ended.

(Third Embodiment)

Figure 12:
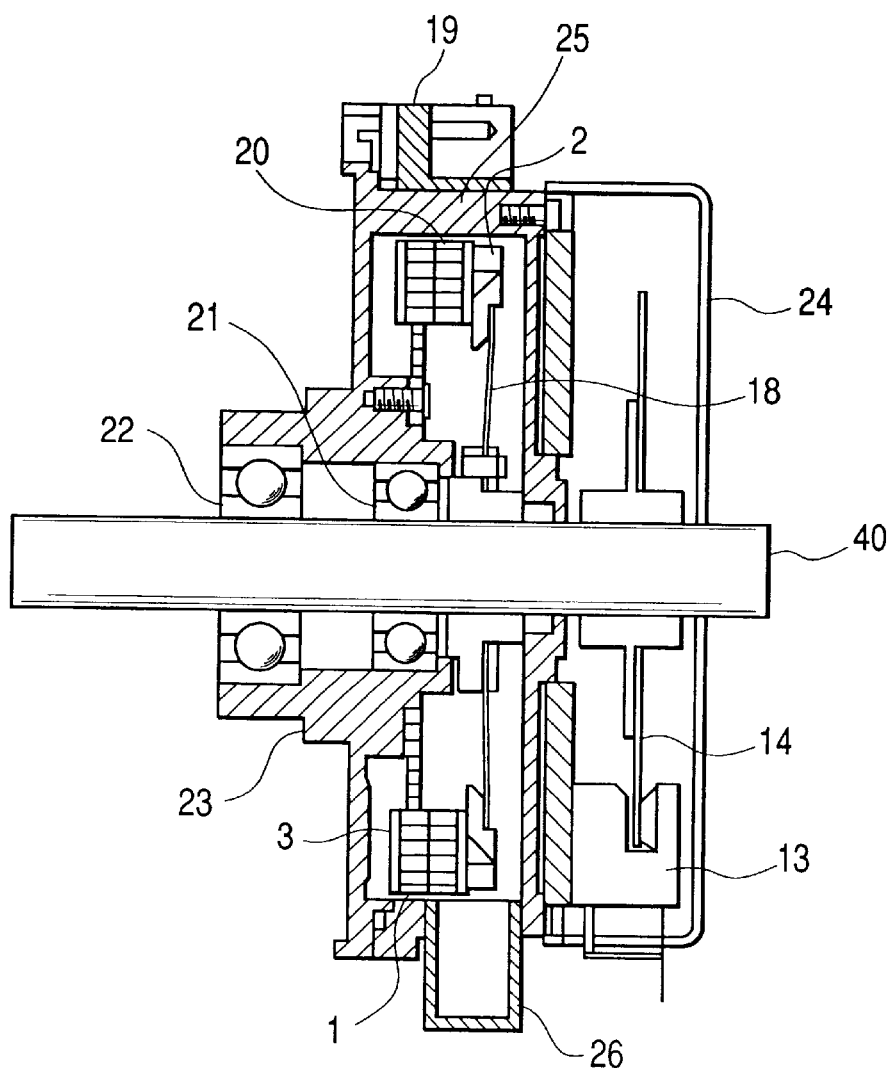
FIG. 12 is a sectional view of the vibration type actuator of the third embodiment.

FIG. 12 is a sectional view illustrating the third embodiment.

In FIG. 12, the apparatus includes an interrupter 13, a scale 14 graduated for detecting an angle of rotation of the rotational shaft 40, a spring 18 for keeping the rotor 2 in press contact with the vibration member 1, a connector 19 for supplying power to the piezoelectric member 3, bearings 21, 22 for holding the rotational shaft 40, a base plate 23, a cover 24 for covering the interrupter 13 and scale 14, a cover 25 for covering the vibration member 1, the rotor 2, etc., and a wear degree confirmation window 26 provided in a part of the cover 25 and below the friction member 20 so as to receive and store the wear particles from the friction member 20. The amount of wear particles can be readily checked through this window 26 and the exchange time can be confirmed easily by visually checking the amount of wear particles.

Figure 13:
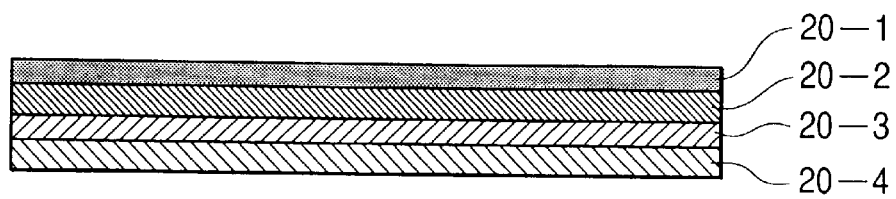
FIG. 13 is a view illustrating an example of the friction member of FIG. 12.

FIG. 13 shows an example of the friction member comprised of multiple layers (20-1, 20-2, 20-3, 20-4) which have different colors, e.g., red, yellow, and so on. For example, friction materials of different colors each having a thickness of 10 μm are superimposed on one another. In this case the colors of the wear particle vary according to the degree of progress of the wear, so that the degree of wear can be confirmed more easily.

(Fourth Embodiment)

Figure 14:
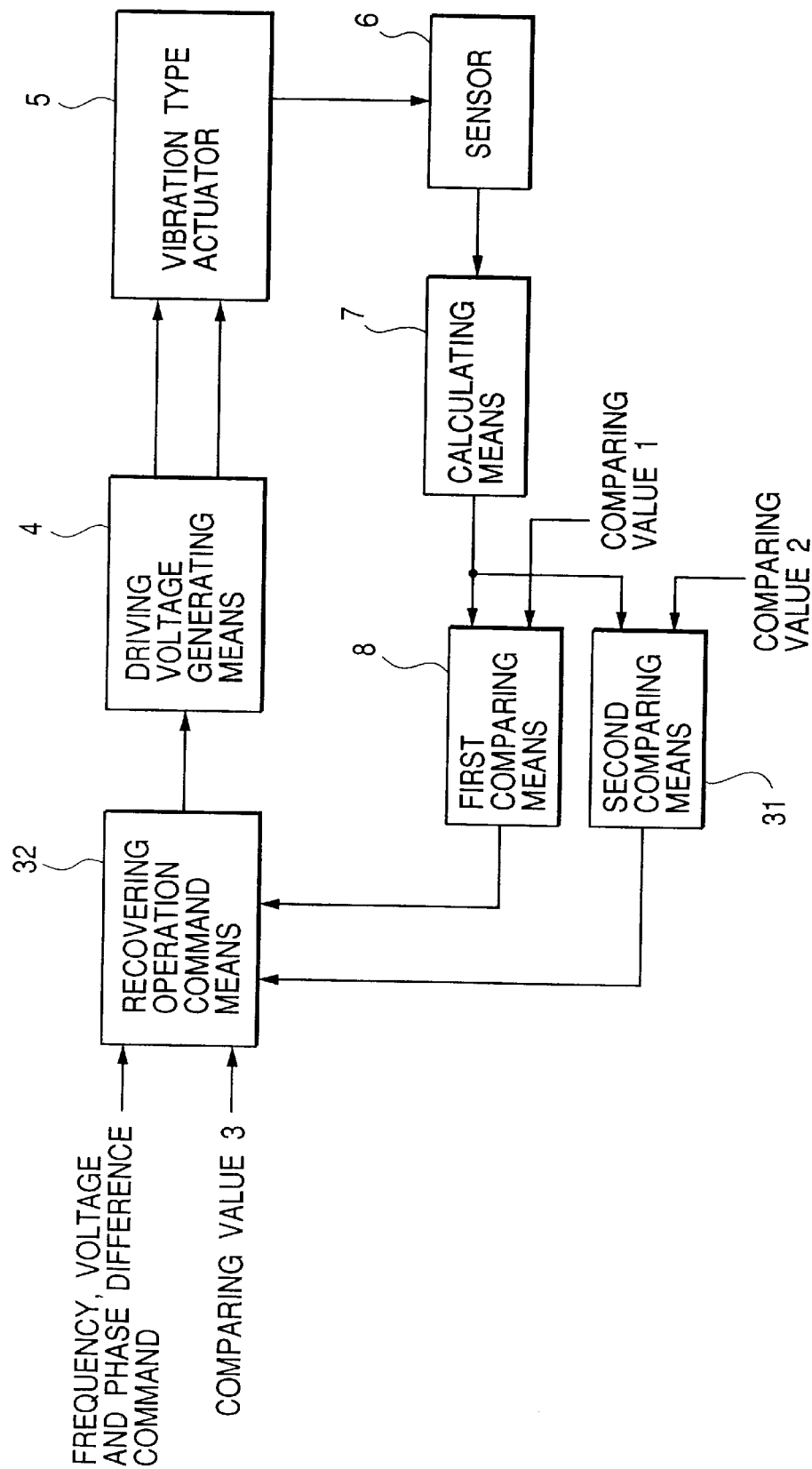
FIG. 14 is a block diagram illustrating a fourth embodiment of the present invention.
Figure 15:
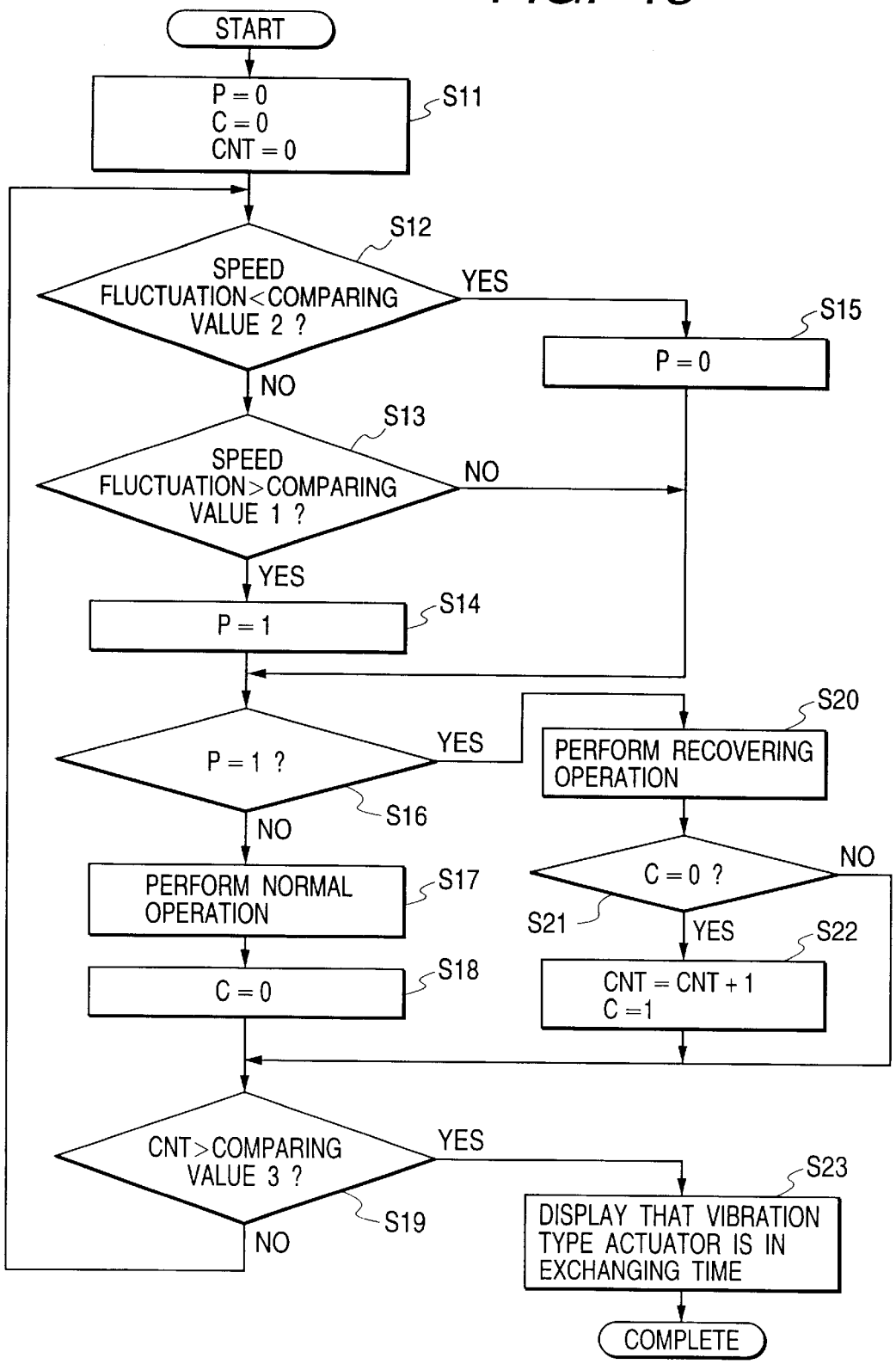
FIG. 15 is a flowchart explaining the operation of the embodiment of FIG. 14.

FIG. 14 is a block diagram illustrating a fourth embodiment and FIG. 15 is a flowchart illustrating the operation of recovery operation command means.

In FIG. 14, the recovery operation command means 32 sends an operation command to the driving voltage generating means 4 by determining whether the vibration type actuator 5 should perform a recovering operation of the friction surface, based on the result of first comparing means 8 for comparing the output of calculating means 7 with a comparing value 1 and the result of second comparing means 31 for comparing the output of calculating means 7 with a comparing value 2.

In FIG. 15, P represents a recovery operation flag, C represents a number-of-recovering-operations flag, and CNT represents a recovering operation counter.

This recovery operation command means 32 receives inputs of frequency, voltage, and phase difference commands from the command means (not shown) and a comparing value 3 for the number of recovery operations.

The recovery operation command means 32 determines whether these frequency, voltage, and phase difference commands should be output to the driving voltage generating means 4 or these parameters should be output in accordance-with a recovery operation, based on the comparison results from the first comparing means 8 and from the second comparing means 31, and outputs each command to the driving voltage generating means 4.

After the operation of the flowchart of FIG. 15 is started, P (the recovery operation flag which indicates "unnecessary" by P=0 or "necessary" by P=1), C (the number-of-recovering-operations flag which indicates "0" by C=0 or "1" by C=1), and CNT (the recovery operation counter) are each initialized to a value 0 (S11).

In S12 a speed fluctuation (speed variation detected in a fashion similar to the fashion of the embodiment of FIG. 1) is compared with the comparing value 2. If the speed fluctuation is smaller, the recovery operation flag P is set to the unnecessary state in S15 (P=0) and the flag P is checked in S16. If the speed fluctuation is greater in S12, it is determined in S13 this time whether the speed fluctuation is greater than the comparing value 1 (comparing value 1>comparing value 2). When the speed fluctuation is greater, the flag P is set to P=1 in S14 and the flow goes to S16.

If P≠1 in S16, the recovering operation is unnecessary. Then the normal operation is carried out in S17. Since the recovery operation is not carried out yet, the number-of-recovery operations flag C is set to C=0 (S18) and then it is determined whether the number of recovery operations reaches a predetermined number (comparing value 3) (S19).

When the number of recovery operations has not yet reached the predetermined number in S19, the flow returns to S12 to perform the same processes.

On the other hand, when a recovery operation is necessary (P=1) in S16, a recovery operation is carried out in S20. When the number-of-recovery-operations flag C=0 in S21, 1 is added to the recovery operation counter CNT and the number-of-recovery flag is set as C=1 in S22.

When the value of the recovery operation counter CNT exceeds a predetermined value (the comparing value 3) in S19, an indication that the exchange time is approaching is displayed in the display means (not shown) in S23. When the value of the recovery operation counter CNT does not exceed the comparing value 3, the flow returns to S12 to repeat the recovery operation until the speed fluctuation becomes smaller than the comparing value 2, so as to set the recovery operation flag P=0.

Described in more detail, in the present embodiment the characteristics of the vibration type actuator 5 are good during the initial period and the commands from the command means (not shown) are thus output to the driving voltage generating means 4 as they are received. With degradation of these characteristics, however, variation in the rotational speed will increase even if the actuator is driven at a constant frequency, voltage, and phase difference.

Then, the difference between the maximum and minimum of the rotational speed within the fixed time, calculated in the calculating means 7, becomes larger, increasing the input to the first comparing means 8. When the speed fluctuation becomes greater than the comparing value 1, the recovery operation command means 32 successively sets the parameters of the recovery operation for the driving voltage generating means 4. As the recovery operation continues, the fluctuations in the speed detected by the sensor 6 become smaller.

Thereafter, the output of the calculating means 7 becomes smaller, the input to the second comparing means 31 becomes smaller, and the speed fluctuation becomes smaller than the comparing value 2. Then the recovery operation command means 32 is configured so as to end the recovery operation and send the parameters to the driving voltage generating means 4 in accordance with commands from the command means (not shown).

Further, the recovery operation command means 32 displays an indication that the exchange time of the vibration type actuator is approaching when the number of recovery operations (the number of recovery operations completed) becomes greater than the comparing value 3. Specifically, every time P transitions from 0 to 1, CNT=CNT+1 is executed. When the number of transitions of P from 0 to 1, i.e., the number of recovery operations completed reaches the predetermined value, it is indicated that an exchange of actuator is necessary.

In another configuration, the apparatus may be constructed so as to end a recovery operation, irrespective of the outputs from the comparing means 8, 31, when the time from the start of a recovery operation reaches a predetermined time or when the number of rotations of the actuator 5 becomes a value not smaller than a predetermined number of rotations.

Next described are the parameters output during a recovery operation from the recovery operation command means 32.

For recovery of the friction surface, it is necessary to repeat continuous quick rotation or continuous quick inversion of rotation. For that purpose, the voltage command is increased by setting the driving frequency to a frequency near the resonant frequency of the vibration type actuator 5. For the inversion operation, the phase difference is repetitively switched between 90° and −90°. Execution of such operation can clear away wear particles stuck to the rotor 2, thereby recovering a desired condition of the friction (wear) surface and recovering the performance of the vibration type actuator 5.

Figure 16:
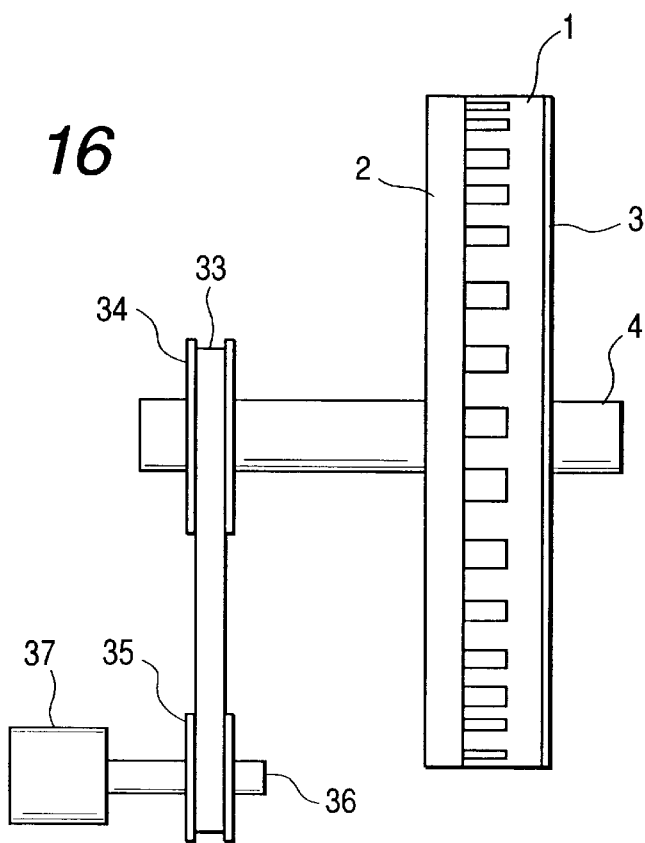
FIG. 16 is a schematic diagram illustrating an example of recovering means.
Figure 17:
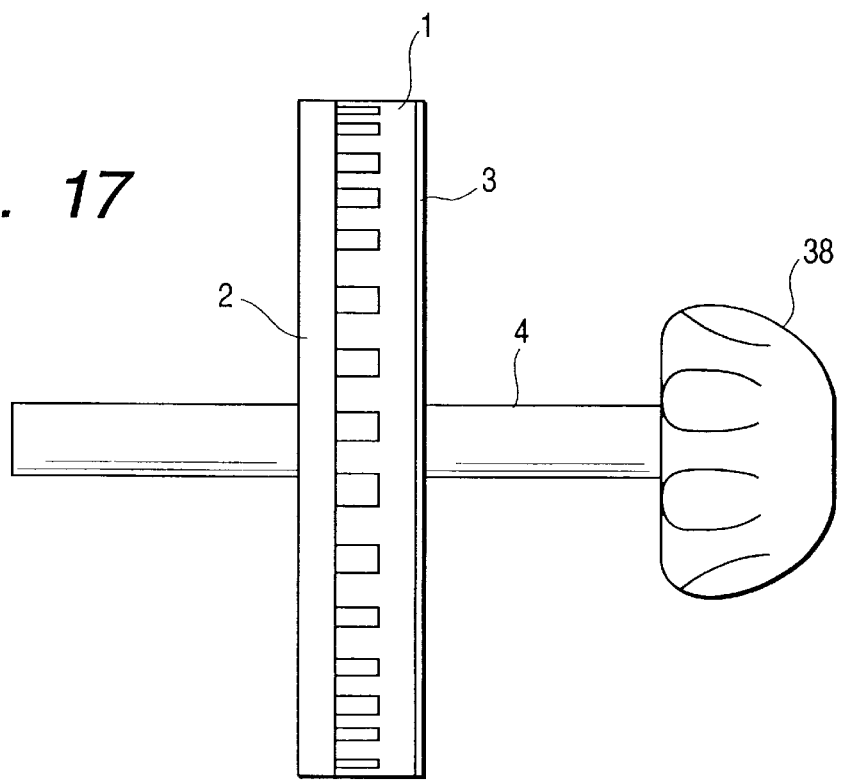
FIG. 17 is a schematic diagram illustrating another example of the recovering means.

FIG. 16 and FIG. 17 show other recovering means.

In FIG. 16, a vibration driven device includes a belt 33, pulleys 34, 35 between which the belt 33 is stretched, a rotational shaft 36 connected to the center of the pulley 35, and a coupling 37 for connecting another rotating means, such as a DC motor (not illustrated), to the rotational shaft 36.

If a display device (not illustrated) is arranged to display the necessity of a recovery operation, for example, with the determination of P=1 in S16 of FIG. 15, the performance of an actuator can be recovered on a regular basis even without the means for automatically performing the recovery operation as illustrated in FIG. 14. FIG. 16 illustrates a configuration for forcing the vibration type actuator 5 to rotate through the coupling on the occasion of regular maintenance, thereby removing the wear particle.

In FIG. 17, a vibration type actuator 5 includes a knob 38 for manually rotating a rotational shaft 4 of the vibration type actuator 5. In this case, the operator can readily rotate the rotor 2 by hand when maintenance is necessary. The means for notifying a user of the necessity of a recovery operation or of an exchange time of the vibration type actuator 5 may be any one of display devices such as a liquid crystal display or a CRT, alarms from various sound sources, recording on a recording medium such as a floppy disk, a flash ROM, or paper, and a message through a network such as a LAN.

(Fifth Embodiment)

Figure 18:
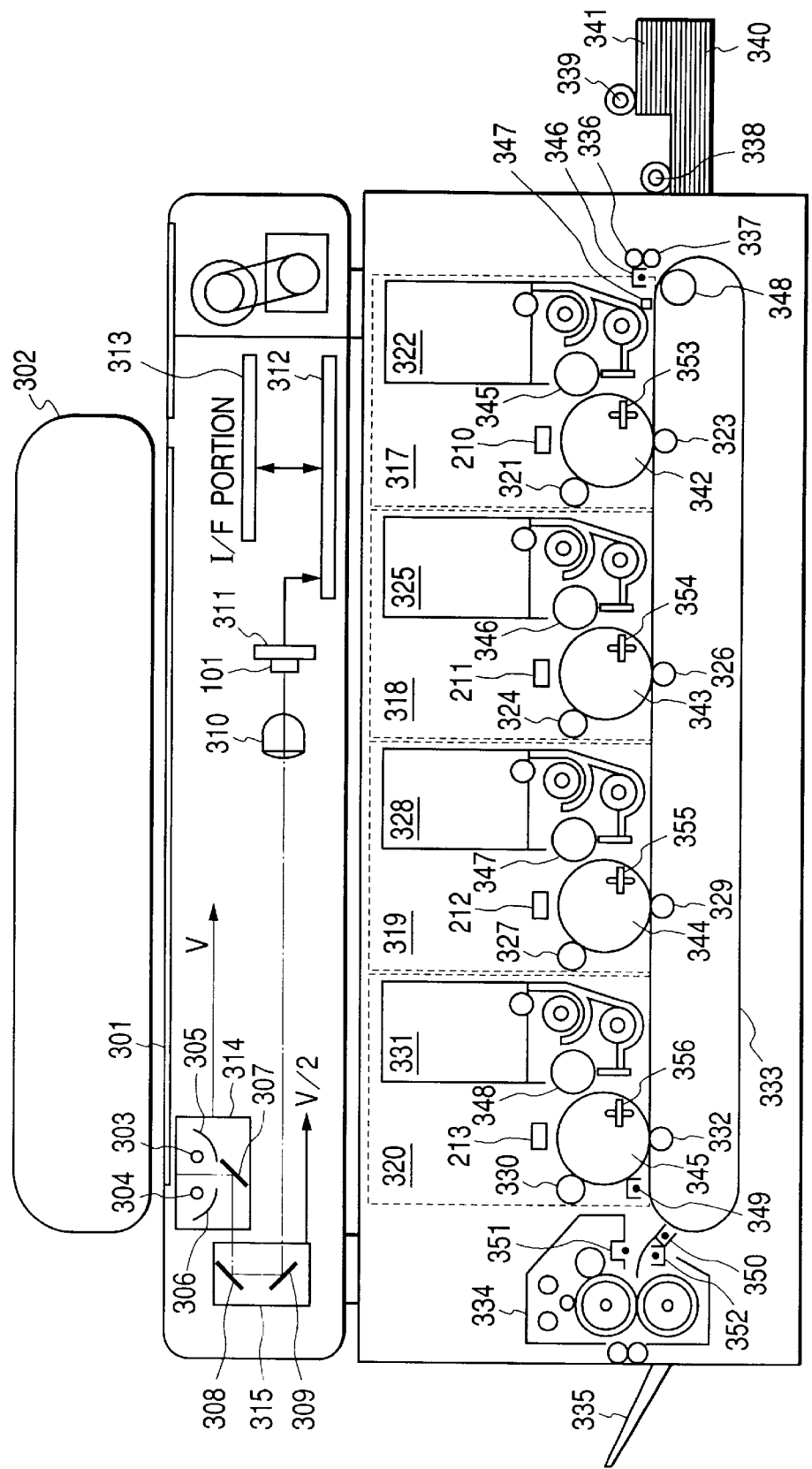
FIG. 18 is a structural diagram illustrating the structure of a copying machine.
Figure 19:
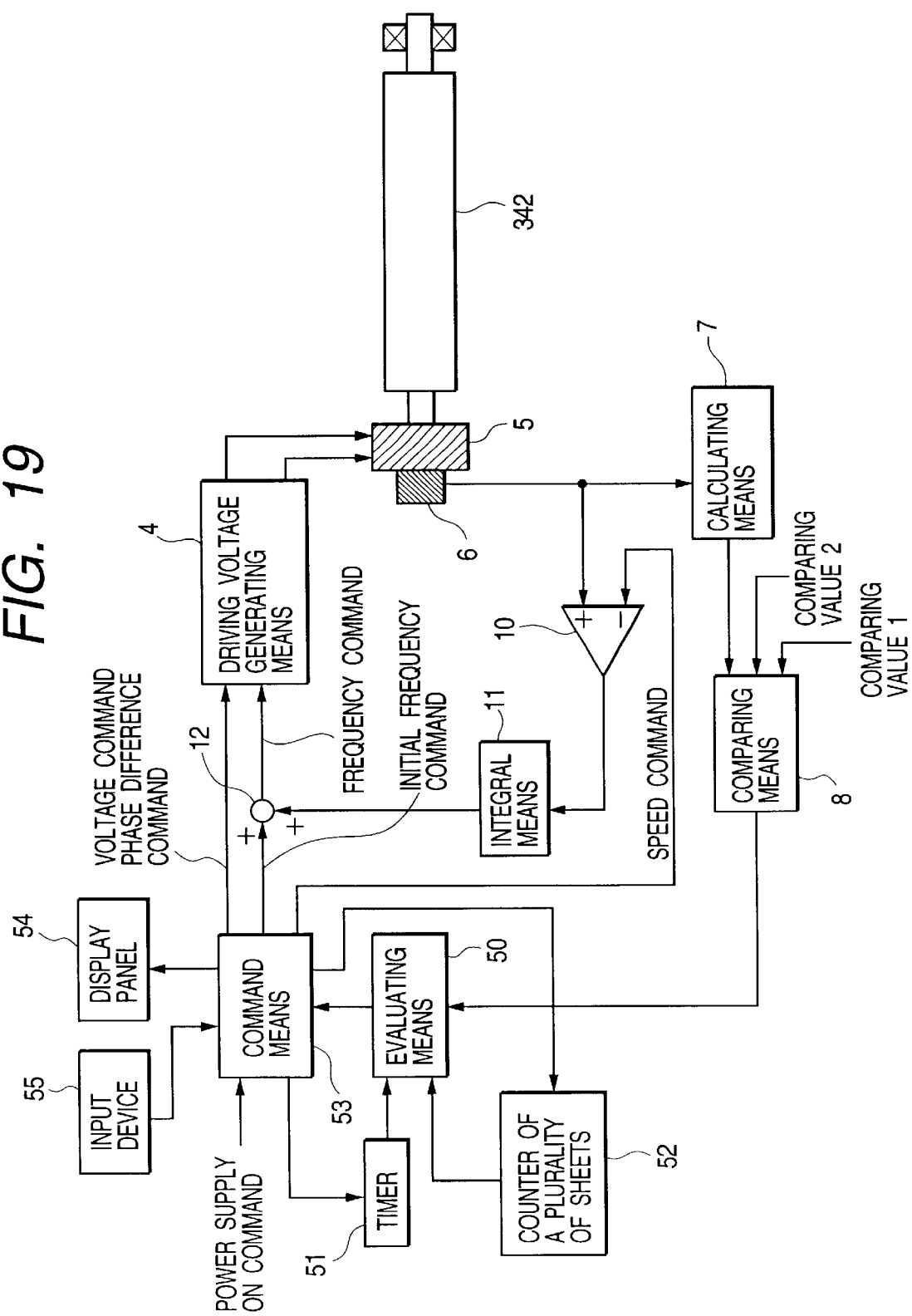
FIG. 19 is a block diagram illustrating a fifth embodiment of the present invention.

FIG. 18 is a diagram illustrating the overall structure of a color image forming apparatus which is the fifth embodiment of the present invention and FIG. 19 is a block diagram illustrating a part of a control section thereof. The structure of the color image forming apparatus will be described referring to FIG. 18.

First described is the structure of a reader section. In FIG. 18, the feeder section includes a CCD 101, a substrate 311 on which the CCD 101 is mounted, a 301, a printer processing section 312, an original glass plate 301, an original feed system 302, light sources 303, 304 for illuminating an original, reflectors 305, 306 for collecting beams from the light sources (303, 304) to the original, designate mirrors 307 to 309, a lens 310 for condensing reflected light or projected light from the original onto the CCD 101, a carriage 314 for accommodating the light sources (303, 304), the reflectors (305, 306), and the mirror 307, a carriage 315 for accomodating the mirrors (308, 309), and an interface section 313 between the reader section and another IPU or the like. The carriage 314 and the carriage 315 are mechanically moved at speed V and at speed V/2, respectively, in a direction perpendicular to the electrical scanning (main scanning) direction of the CCD 101, thereby scanning (sub-scanning) the entire surface of the original.

The original on the original glass plate reflects light from the light sources (303, 304) and the reflected light is guided onto the CCD 101 to be converted to electric signals. Then the electric signals (analog image signals) are put into the image processing section 312 to be converted to digital signals. The converted digital signals are processed and thereafter sent to the printer section to be used for formation of an image.

Next described is the structure of the printer section. The printer section includes an M (magenta color) image forming section, 317 a C (cyan color) image forming section 318, a Y (yellow color) image forming section 319, and a K (black color) image forming section 320. Since structures of the respective sections are the same, only the structure of the M image forming section 317 will be described and the description of the other image forming sections will be omitted.

The M image forming section 317 includes a photosensitive drum 342, on a surface of which a latent image is formed by light from LED array 210. A primary charger 321 charges the surface of the photosensitive drum 342 to a predetermined potential, thereby preparing for formation of a latent image. A developing device 322 develops the latent image on the photosensitive drum 342 to form a toner image.

The developing device 322 includes a sleeve 345 for applying a development bias to develop the latent image. A transfer charger 323 effects discharge from the back of transfer belt 333 to transfer the toner image on the photosensitive drum 342 onto a recording sheet or the like placed on the transfer belt 333. Since the present embodiment has high transfer efficiency, it is not provided with a cleaner section. Of course, it will be a apparent that a cleaner section may be used.

Next described are procedures for forming an image on the recording sheet or the like. Recording sheets or the like stored in cassettes (340, 341) are picked up one by one by a pickup roller (339, 338) to be supplied onto the transfer medium carrying belt 333 by feed rollers (336, 337). The recording sheet thus supplied is charged by an adhesion charger 346.

A transfer belt roller 348 drives the transfer medium carrying belt 333 and charges the recording sheet or the like in cooperation with the adhesion charger 346 to adhere the recording sheet or the like to the transfer medium carrying belt 333. A sheet leading end sensor 347 which detects the leading end of the recording sheet on the transfer medium carrying belt 333.

A detected signal by the sheet leading end sensor 347 is sent from the printer section to the color reader section to be used as a sub-scanning synchronous signal when the video signals are sent from the color reader section to the printer section. After this, the recording sheet or the like is carried by the transfer medium carrying belt 333 and toner images are formed on the surface thereof in the order of M, C, Y, and K in the image forming sections 317 to 320, respectively. The recording sheet or the like having passed the K image forming section 320 undergoes charge elimination in charge eliminating charger 349 in order to facilitate separation thereof from the transfer medium carrying belt 333 and thereafter is separated from the transfer medium carrying belt 333.

A stripper charger 350 prevents image disturbance due to stripping charge when the recording sheet or the like is separated from the transfer medium carrying belt 333. The recording sheet or the like thus separated is charged by pre-fixation chargers (351, 352) in order to make up for adhesive strength of toner so as to prevent image disturbance and thereafter the toner image is thermally fixed by a fixing device 334. Then the recording sheet is discharged onto a discharge tray 335.

Here, known vibration type actuators are used as driving actuators for rotating the photosensitive drums (342 to 345) and the transfer medium carrying belt roller 348. Since one image is formed by cooperative operation of the plural actuators as described, degradation of characteristics of even one actuator would result in a failure to form a beautiful image.

FIG. 19 is a block diagram illustrating a driving circuit of the vibration type actuators of FIG. 18. In FIG. 19, command means 53 is provided for issuing commands of frequency (through adder 12), phase difference, and voltage amplitude of the two-phase alternating voltages applied to the vibration type actuator 5, to the driving voltage generating means 4 according to a power "on" command from further command means or a switch (not shown) and an output from evaluating means 50 described hereinafter. A timer 51 is provided for measuring the time while the voltage command is not 0 [V], according to a command from the command means 53. A number-of-copies counter 52 is provided for counting the number of copies, according to a command from the command means 53. Evaluating means 50 is provided for outputting an evaluation result to the command means 53 according to outputs from the comparing means 8 receiving inputs of comparing values 1, 2 (see FIG. 15), from the timer 51, and from the number-of-copies counter 52. A display panel 54 is provided for displaying a message received from the command means 53 according to the output of the evaluating means 50, and an input device 55 is provided for instructing the command means 53 to execute a copying operation.

The photosensitive drum 342 is connected to the vibration type actuator 5 and is rotating at fixed speed during formation of an image on the recording sheet.

The speed is controlled as follows: the current speed is detected by the sensor 6, the differential amplifier 10 detects the difference between the speed command and the current speed, and integral means 11 integrates this difference. If the current speed is smaller than the speed command, the output from the integral means 11 decreases so as to change the frequency command being the output from the adding means 12 to a lower frequency. Then the speed increases, as seen from FIG. 4, so as to be controlled to approach the command speed, which is a target speed. In tandem with this, calculating means 7 detects fluctuations of the speed of the vibration type actuator 5 in a fashion similar to the fashion of the embodiment of FIG. 1, the comparing means 8 compares the output from calculating means 7 with comparing value 1 and comparing value 2, and the comparison result is output to evaluating means 50.

The timer 51 is configured so as to measure the time during the operation of the vibration type actuator 5 and the number-of-copies counter 52 counts the number of copies. The operations of the evaluating means 50 and command means 53 will be described using flowcharts.

The flowcharts are shown in FIGS. 20A and 20B, FIG. 21, and FIG. 22.

Figure 20B:
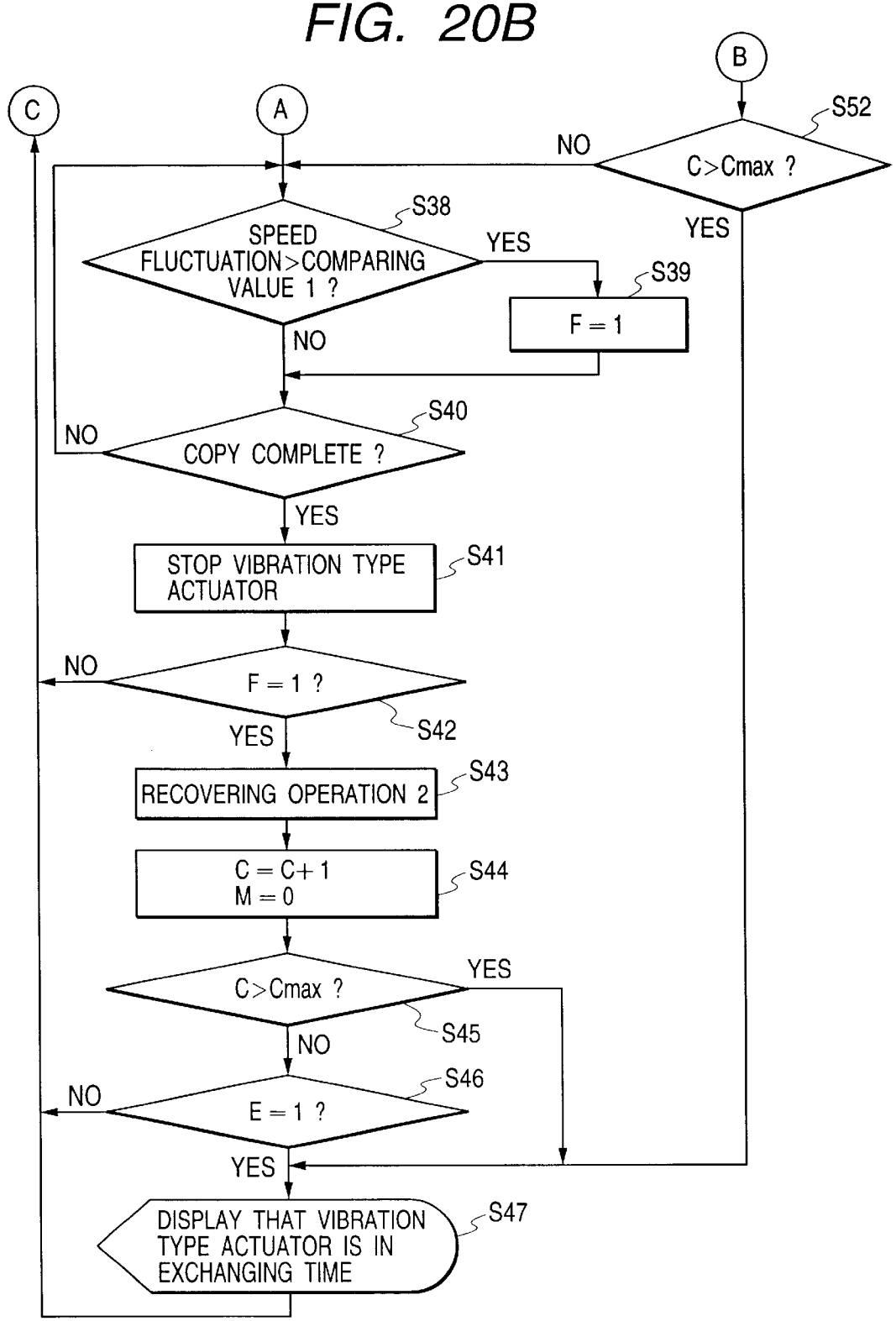

In FIGS. 20A and 20B, C represents the number of recovery operations that have been performed, E represents an exchange flag to indicate whether the exchange time has come, arrived, and M indicates the number of copies.

After the operation of FIGS. 20A and 20B is started, the flags C, E, and M each are initialized to 0 (S31). When a power "on" command is received from the further command means (not shown) in FIG. 19 (S32), a recovery operation 1 described hereinafter is executed. This is carried out for every power "on" operation.

Then a "copy start" command is awaited from the input device 55 (S34). With reception of the "copy start" command, 1 is first added to the number of copies (M) and a recovery execution flag (F) indicating whether a recovery operation should be carried out is reset to 0 (S35). When the number of copies reaches a predetermined number (Mmax) (S36), a recovery operation 1 described hereinafter is carried out (S50); if not, a copying operation is started (S37).

After a recovery operation is carried out in S50, 1 is added to the number of recovery operations (C) and the number of copies (M) is reset to 0 in S51. It is then determined whether the number of recovery operations C exceeds a predetermined number (Cmax) (S52). If "yes", an indication that the exchange time of the vibration type actuator 5 is approaching is displayed on the display panel 54 (S47).

If the number C does not exceed the predetermined number (Cmax) in S52, the flow goes to S38 to return to the copying operation.

In the copying operation the command means 53 outputs the speed command, voltage command, phase difference command, and initial frequency command so as to implement the speed of rotations during the copying operation.

When the speed fluctuation obtained by the calculating means 7 is greater than the comparing value 1 in S38, the recovery execution flag (F) is set to 1 in order to carry out a recovery operation 2 described hereinafter (S39).

On the other hand, when the speed fluctuation is smaller than the comparing value 1, the comparison between the speed variation and the comparing value 1 is repeated before the copying operation is completed (S38, S40). After completion of the copying operation, the vibration type actuator 5 is stopped (S41). When the recovery execution flag (F) is 0 in S42, the next "copy start" command is awaited. When the recovery execution flag (F) is 1, a recovery operation 2 described hereinafter is carried out (S43).

After completion of the recovering operation 2, 1 is added to the number of recovery operations (C) and the number of copies (M) is reset to 0 (S44). When the number of recovering operations (C) exceeds the predetermined number (Cmax) in S45, an indication that the exchange time is approaching is displayed in the display panel 54 and the next "copy start" command is awaited (S47). When the number of recovery operations (C) does not exceed the predetermined number (Cmax) in S45, the flow goes to S46 to check the exchange flag (E). If the exchange flag (E) is 0, the next "copy start" command is awaited.

When the exchange flag (E) is 1 in S46, an indication that the exchange time is approaching is displayed in the display panel 54 and the next "copy start" command is awaited (S47).

A recovery operation is carried out in this way either upon degradation of the characteristics of the vibration type actuator 5 or on a regular basis, whereby the friction surface of the vibration type actuator 5 is refreshed, so that a beautiful image can always be formed on the recording sheet.

The reason why the recovering operation 1 is carried out at power "on" is that the period from power "off" to power "on" is normally relatively long and the rotor 2 may become fixed to the friction member 20 in certain cases where the friction member 20 of the vibration type actuator 5 is made of resin.

If the rotor were separated by vibration of the vibration member 1, wear particles could stick to the rotor 2 so as to degrade these characteristics. Even if sticking is of the extent that does not affect the image, degradation could proceed gradually. Therefore, the friction surface can always be kept in good order by carrying out a recovery operation 1 for every "on" operation.

In the case where the apparatus is continuously used by keeping the power "on", the friction surface can also be kept similarly in good order by carrying out a recovery operation 1 every predetermined number (M).

Figure 21:
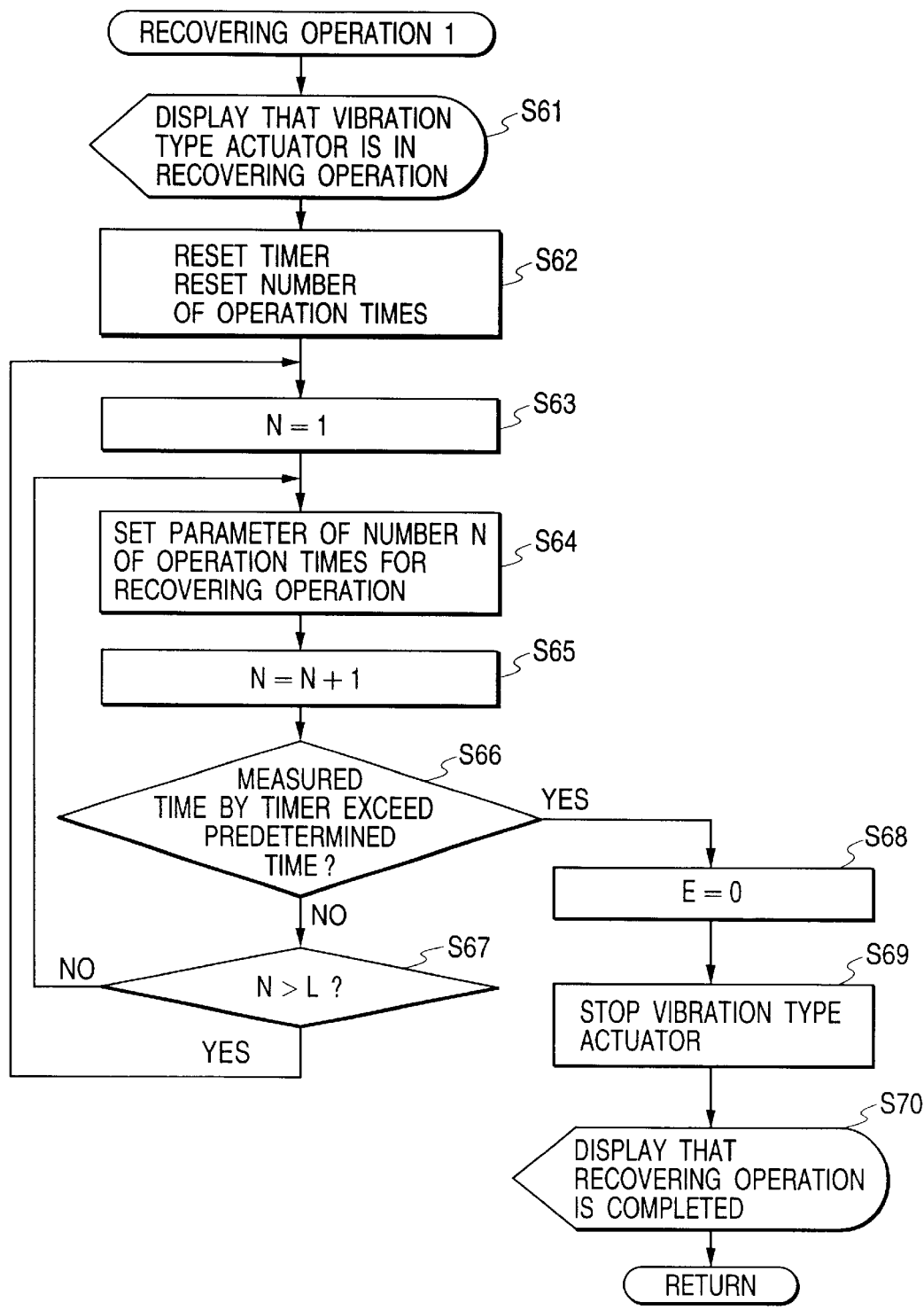
FIG. 21 is a flowchart explaining the operation of the recovery operation 1 of FIGS. 20A and 20B.
Figure 22:
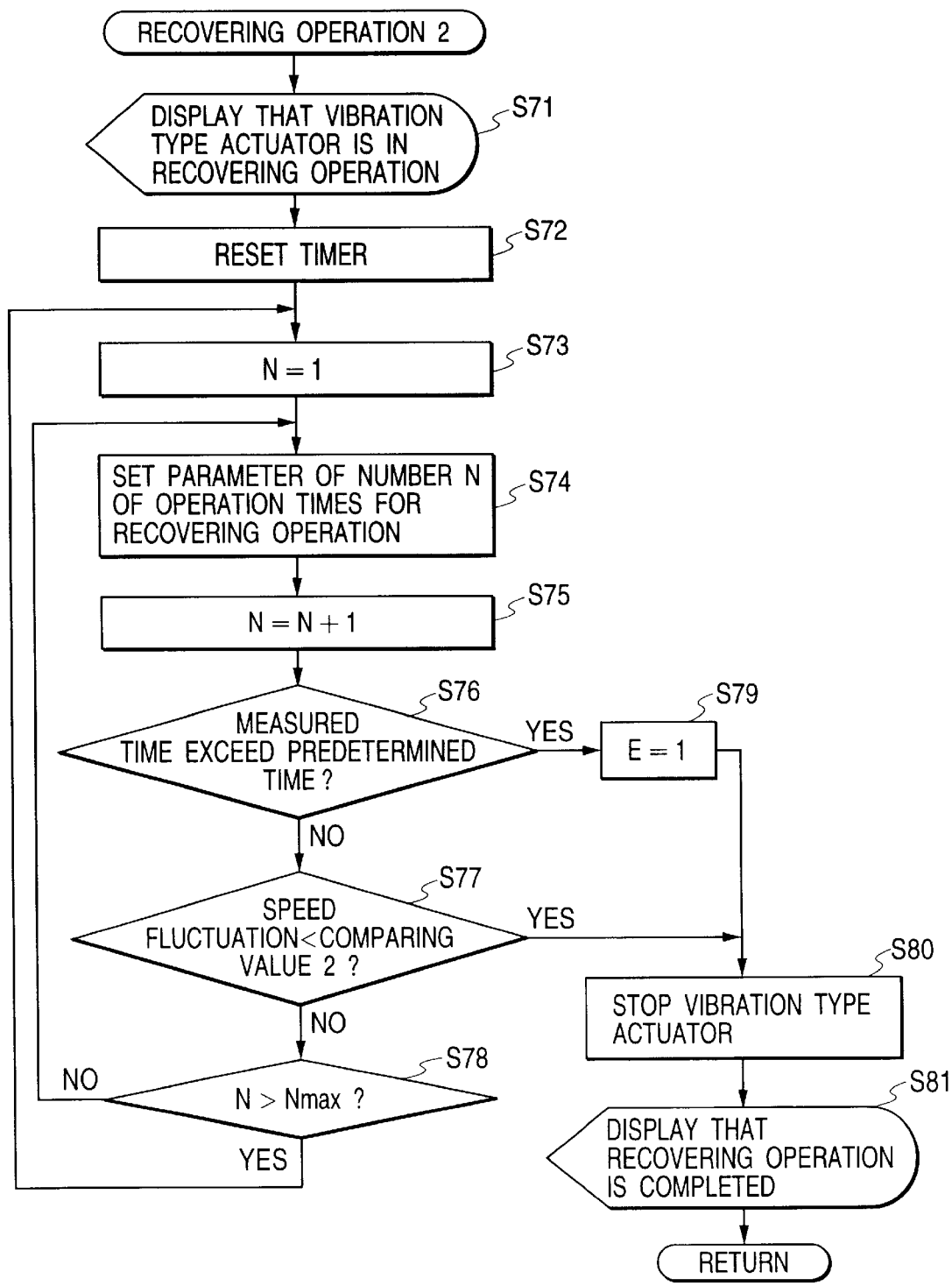
FIG. 22 is a flowchart explaining the operation of the recovery operation 2 of FIGS. 20A and 20B.

Now, a recovery operation 1 will be described referring to FIG. 21. First, progress of the recovery operation or preparation is displayed in the display panel 54 (S61) and measurement of time is started after resetting the timer 51 and the number of operations (S62).

Then the parameter N for recovery operation is set to N=1 (the first operation) (S63), the parameters are set for the Nth recovery operation (S64), then 1 is added to N (S65), and whether the timer exceeds a predetermined time is determined (S66).

If the timer does not exceed the predetermined time in S66, it is determined whether the number of recovery operations exceeds a predetermined value L (S67). If not, the flow returns to S64 to carry out the same operation. If the number exceeds the predetermined value, the flow returns to S63.

Namely, this recovery operation is carried out by changing the operation parameters. By changing the operation parameters, the actuator is driven in different driving patterns, e.g., by driving at high driving speed or by repeating an inverse driving operation.

On the other hand, when the measured time of the timer 51 exceeds the predetermined time in S66, the exchange flag is set to E=0 to stop the vibration type actuator 5 (S69). Then completion of the recovery operation is displayed on the display panel 54 or indication to indicate the progress of the recovery operation is erased (S70). Then the recovery operation 1 is ended.

This achieves the recovering effect to some extent, but perfect recovery could not be accomplished in some cases, because the recovery operation 1 is carried out for the fixed time. Then, the speed variation would exceed the comparing value 1.

On that occasion, a recovery operation 2 is carried out to return the condition of the friction surface to good order. Now, the recovery operation 2 will be described referring to FIG. 22. First, the progress of the recovery operation or preparation is displayed on the display panel 54 (S71) and the measurement of time is started after resetting of the timer 51 (S72).

The recovery operation 2 is carried out in different modes with changing the operation parameters, similar to recovery operation 1 (S73 to S78, or S74 to S78).

When the speed fluctuation becomes smaller than the comparing value 2, i.e., when the friction surface is recovered (refreshed) in S77, the vibration type actuator 5 is stopped (S80). Then completion of the recovery operation is displayed on the display panel 54 (S81) or an indication to indicate the progress of the recovering operation is erased. Then the operation is terminated.

When the measured time of the timer 51 exceeds the predetermined time during driving by changing the operation parameters in S76, it is determined that recovery cannot be expected by performing a recovery operation. Then the exchange flag (E) is set to 1 in S79 to stop the vibration type actuator 5 (S80). Then completion of the recovery operation is displayed on the display panel 54 or an indication to indicate the progress of the recovery operation is erased. Then the operation is completed.

With increasing wear of the friction member 20, execution of a recovery operation eventually will result in failure to recover the desired performance, because the output torque of the vibration type actuator 5 is decreased, so as to increase load fluctuations and the influence of sticking of performing a wear particles.

In that case, it is determined that recovery cannot be expected by recovering operation 2 and an indication to indicate that the exchange time is approaching is displayed on the display panel 54. In the present embodiment the current actuator is replaced by another actuator when it cannot be recovered by a recovery operation 2. In another configuration, the apparatus may also be arranged to perform a recovery operation with another recovery means, as illustrated in FIG. 16 or FIG. 17.

The operation of one vibration type actuator was described herein, but, in the case wherein there are four vibration type actuators for the respective photosensitive drums (342 to 345) and one vibration type actuator connected to the transfer medium carrying belt roller 348 for driving the transfer medium carrying belt 333 as illustrated in FIG. 18, recovery operations of the actuators are carried out simultaneously. This is because it is assumed that conditions of the friction surfaces are almost identical from substantially like operations of the five vibration type actuators and because the photosensitive drums (342 to 345) and transfer medium carrying belt 333 could be damaged if only one of the actuators is rotated, as the transfer medium carrying belt 333 is in contact with the photosensitive drums (342 to 345).

We claim:

1. A driving apparatus for a vibration type actuator apparatus in which vibration is generated in a vibration member by applying a cyclic signal to an electromechanical energy conversion element provided at the vibration member, and a movable member having a friction surface in contact with the vibration member is driven relative to the vibration member by vibration generated in the vibration member, said driving apparatus comprising:

a variation detection circuit that detects a variation in an output state of the actuator apparatus or a variation in the cyclic signal during a driving operation under a predetermined driving condition; and an evaluation circuit that evaluates a condition of the friction surface of the vibration member, based on an amount of variation in the output state or the cyclic signal detected by said variation detection circuit.

2. The driving apparatus according to claim 1, wherein, when an amount of variation detected by said variation detection circuit is larger than a predetermined amount, said evaluation circuit determines that a condition of the friction surface of the movable member requires maintenance.

3. The driving apparatus according to claim 1, wherein the predetermined driving condition is a condition for implementing a constant-speed driving control for keeping a driving speed constant or a condition for achieving driving with a cyclic signal having a fixed waveform state.

4. The driving apparatus according to claim 1, wherein said variation detection circuit detects a variation in a driving speed state.

5. The driving apparatus according to claim 1, wherein said variation detection circuit detects a variation in frequency of the cyclic signal or a variation in amplitude of the cyclic signal.

6. The driving apparatus according to claim 1, wherein said variation detection circuit detects a variation in the output state of the actuator or a variation in the cyclic signal caused by a change in resonant frequency of the cyclic signal.

7. The driving apparatus according to claim 1, further comprising a notification circuit, wherein when an amount of variation detected by said variation detection circuit is greater than or equal to a predetermined amount, said evaluation circuit determines that a condition of the friction surface of the movable member requires maintenance, and said notification circuit performs a notifying operation to inform a user that the condition of the friction surface of the movable member requires maintenance.

8. The driving apparatus according to claim 7, wherein said notification circuit performs a notifying operation to inform the user that the actuator apparatus needs to be replaced.

9. The driving apparatus according to claim 1, further comprising a recovery operation control circuit, responsive to an evaluation result of said evaluation circuit, for driving said actuator apparatus in a predetermined mode so as to perform a recovery operation of the friction surface of the movable member.

10. The driving apparatus according to claim 9, wherein said recovery operation control circuit drives the actuator apparatus at a speed higher than a predetermined speed or drives the actuator apparatus forward and backward repeatedly.

11. The driving apparatus according to claim 1, wherein said variation detection circuit detects a variation in a phase difference between the cyclic signal and a vibrating state of the actuator apparatus.

12. A driving apparatus for a vibration type actuator apparatus in which vibration is generated in a vibration member by applying a cyclic signal to an electromechanical energy conversion element provided at the vibration member, and a movable member having a friction surface in contact with the vibration member is driven relative to the vibration member by vibration generated in the vibration member, said driving apparatus comprising:

an evaluation circuit that evaluates a condition of the friction surface of the movable member; and a recovery operation control circuit that drives said actuator apparatus in a predetermined mode when said evaluation circuit determines that a condition of the friction surface of the movable member is in a predetermined state, thereby effecting a recovery operation of the friction surface of the movable member.

13. The driving apparatus according to claim 12, wherein said recovery operation control circuit drives the actuator apparatus at a speed higher than a predetermined speed or drives the actuator apparatus forward and backward repeatedly.

14. The driving apparatus according to claim 12, wherein said recovery operation control circuit continues a recovery operation without interruption until said evaluation circuit determines that a desired condition of the friction surface is recovered.

15. The driving apparatus according to claim 14, further comprising:

a recovery operation counter circuit that determines when said recovery operation control circuit has performed a predetermined number of recovery operations for an actuator apparatus; and a notification circuit, responsive to a determination by said recovery operation counter circuit that said recovery operation control circuit has performed a predetermined number of recovery operations for an actuator, that informs a user that the actuator apparatus needs to be replaced.

16. The driving apparatus according to claim 14, further comprising a notification circuit that informs a user that an actuator apparatus needs to be replaced when said recovery operation control circuit performs a recovery operation for a predetermined time and the desired condition of the friction surface of the movable member is not recovered.

17. The driving apparatus according to claim 12, further comprising:

a controller that actuates said recovery operation control circuit prior to a start of a driving operation of the actuator apparatus by said driving apparatus or at a time when a number of driving operations of the actuator apparatus reaches a predetermined number, independent of an evaluation result of said evaluation circuit.

18. A driving apparatus for a vibration type actuator apparatus in which vibration is generated in a vibration member by applying a cyclic signal to an electromechanical energy conversion element provided at the vibration member, and a movable member having a friction surface in contact with the vibration member is driven relative to the vibration member by vibration generated in the vibration, said driving apparatus comprising:

an evaluation circuit that evaluates a condition of the friction surface of the movable member; and a notification circuit, responsive to an evaluation by said evaluation circuit that a condition of the friction surface of the movable member requires maintenance, for performing a notifying operation informing a user that a condition of the friction surface of the movable member requires maintenance.

19. The driving apparatus according to claim 18, wherein said notification circuit performs a notifying operation informing a user that the actuator apparatus needs to be replaced.

20. An image forming apparatus having a plurality of vibration type actuator apparatuses, in each of which vibration is generated in a vibration member by applying a cyclic signal to an electromechanical energy conversion element provided at the vibration member, and a movable member having a friction surface in contact with the vibration member is driven relative to the vibration member by vibration generated in the vibration member, each actuator apparatus being used as a driving source, said image forming apparatus comprising:

an evaluation circuit that evaluates a condition of the friction surface of a movable member of at least one actuator apparatus of said plurality of actuator apparatuses; and a recovery operation control circuit that drives at least said one actuator apparatus of said plurality of actuator apparatuses in a predetermined mode for effecting a recovery operation of the friction surface of the movable member of said at least one actuator apparatus when said evaluation circuit determines that the friction surface of the movable member of said at least one actuator apparatus is in a predetermined state.

21. The image forming apparatus according to claim 20, wherein in the predetermined mode said recovery operation control circuit drives said at least one actuator apparatus at a speed higher than a predetermined speed or drives said at least one actuator apparatus forward and backward repeatedly.

22. A vibration type actuator apparatus in which vibration is generated in a vibration member by applying a cyclic signal to an electro-mechanical energy conversion element provided at the vibration member, and a movable member having a friction surface in contact with the vibration member is driven relative to the vibration member by vibration generated in the vibration member, said actuator apparatus comprising:

a driver, connected to the movable member, that drives the movable member relative to the vibration member, said driver being operable by a motor provided separately from said actuator apparatus or by hand.

23. An apparatus housing a vibration type actuator in which vibration is generated in a vibration member by applying a cyclic signal to an electro-mechanical energy conversion element provided at the vibration member and a movable member having a friction surface in contact with the vibration member is driven relative to the vibration member by vibration generated in the vibration member, said apparatus comprising:

a case; and a confirmation window formed in said case for visually monitoring a condition of a contact surface interface between the vibration member and the friction surface of the movable member.

24. The image forming apparatus according to claim 20, wherein said recovery operation control circuit drives said at least one actuator apparatus and at least another one actuator apparatus of said plurality of actuator apparatuses when said evaluation circuit determines that the friction surface of the movable member of said at least one actuator apparatus is in the predetermined state.

25. The image forming apparatus according to claim 20, wherein said recovery operation control circuit drives each of said plurality of actuator apparatuses when said evaluation circuit determines that the friction surface of the movable member of said at least one actuator apparatus is in the predetermined state.

26. The image forming apparatus according to claim 20, wherein said evaluation circuit evaluates a condition of the friction surface of a movable member of at least another one actuation of said plurality of actuator apparatuses, and wherein said recovery operation control circuit drives at least one of said one actuator apparatus and said another one actuator apparatus in the predetermined mode when said evaluation circuit determines that the friction surface of the movable member of said one actuation apparatus or said another actuation apparatus is in the predetermined state.

27. The image forming apparatus according to claim 20, wherein said evaluation circuit evaluates a condition of the friction surface of a movable member of each of said plurality of actuators apparatuses, and wherein said recovery operation control circuit drives each of said plurality of actuator apparatuses in the predetermined mode when said evaluation circuit determines that the friction surface of the movable member of any one of said plurality of actuator apparatuses is in the predetermined state.

28. A drive control method for a vibration type actuator apparatus in which vibration is generated in a vibration member by applying a cyclic signal to an electromechanical energy conversion element provided at the vibration member, and a movable member having a friction surface in contact with the vibration member is driven relative to the vibration member by vibration generated in the vibration member, said drive control method comprising the steps of:

detecting a variation in an output state of the actuator apparatus or a variation in the cyclic signal during a driving operation under a predetermined driving condition;

evaluating a condition of the friction surface of the vibration member based on an amount of variation in the output state or the cyclic signal detected in said detecting step; and performing a recovery driving operation of the actuator based on an evaluation result in said evaluating step.

29. The drive control method according to claim 28, wherein said evaluating step comprises determining that a condition of the friction surface of the movable member requires maintenance when an amount of variation detected in said detecting step is larger than a predetermined amount.

30. The drive control method according to claim 28, wherein the predetermined driving condition is a condition for implementing a constant-speed driving control for keeping a driving speed constant or a condition for achieving driving with a cyclic signal having a fixed waveform state.

31. The drive control method according to claim 28, wherein said detecting step comprises detecting a variation in a driving speed state.

32. The drive control method according to claim 28, wherein said detecting step comprises detecting a variation in frequency of the cyclic signal or a variation in amplitude of the cyclic signal.

33. The drive control method according to claim 28, wherein said detecting step comprises detecting a variation in the output state of the actuator or a variation in the cyclic signal caused by a change in resonant frequency of the cyclic signal.

34. The drive control method according to claim 28, further comprising the step of notifying a user that the condition of the friction surface of the movable member requires maintenance when an amount of variation detected in said detecting step is greater than or equal to a predetermined amount, and it is determined in said evaluating step that a condition of the friction surface of the movable member requires maintenance.

35. The drive control method according to claim 34, wherein said notifying step comprises informing the user that the actuator apparatus needs to be replaced.

36. The drive control method according to claim 28, wherein the step of performing a recovery driving operation comprises driving the actuator apparatus in a predetermined mode so as to perform a recovery operation of the friction surface of the movable member.

37. The drive control method according to claim 36, wherein the step of performing a recovery operation comprises driving the actuator apparatus at a speed higher than a predetermined speed or driving the actuator apparatus forward and backward repeatedly.

38. The drive control method according to claim 28, wherein said detecting step comprises detecting a variation in a phase difference between the cyclic signal and a vibrating state of the actuator apparatus.

39. A drive control method for a vibration type actuator apparatus in which vibration is generated in a vibration member by applying a cyclic signal to an electromechanical energy conversion element provided at the vibration member, and a movable member having a friction surface in contact with the vibration member is driven relative to the vibration member by vibration generated in the vibration member, said drive control method comprising: evaluating a condition of the friction surface of the movable member; and performing a recovery operation by driving the actuator apparatus in a predetermined mode when it is determined in said evaluating step that a condition of the friction surface of the movable member is in a predetermined state.

40. The drive control method according to claim 39, wherein said step of performing a recovery operation comprises driving the actuator apparatus at a speed higher than a predetermined speed or driving the actuator apparatus forward and backward repeatedly.

41. The drive control method according to claim 39, wherein said step of performing a recovery operation comprises continuing driving the actuator apparatus in the predetermined mode without interruption until it is determined in said evaluating step that a desired condition of the friction surface is recovered.

42. The drive control method according to claim 41, further comprising the steps of:

determining when a predetermined number of recovery operations for an actuator apparatus have been performed; and notifying a user that the actuator apparatus needs to be replaced when it has been determined in the determining step that the predetermined number of recovery operations have been carried out.

43. The drive control method according to claim 41, further comprising the step of:

notifying a user that an actuator apparatus needs to be replaced when the step of performing a recovery operation is carried out for a predetermined time and the desired condition of the friction surface of the movable member is not recovered.

44. The drive control method according to claim 39, further comprising the step of:

performing a recovery operation prior to a start of a driving operation of the actuator apparatus or at a time when a number of driving operations of the actuator apparatus reaches a predetermined number, independent of an evaluation result in said evaluating step.

45. A drive control method for a vibration type actuator apparatus in which vibration is generated in a vibration member by applying a cyclic signal to an electromechanical energy conversion element provided at the vibration member, and a movable member having a friction surface in contact with the vibration member is driven relative to the vibration member by vibration generated in the vibration, said drive control method comprising the steps of:

evaluating a condition of the friction surface of the movable member; and notifying a user when it is determined in said evaluating step that a condition of the friction surface of the movable member requires maintenance.

46. The drive control method according to claim 45, wherein said notifying step comprises notifying a user that the actuator apparatus needs to be replaced.

47. A drive control method for an image forming apparatus having a plurality of vibration type actuator apparatuses, in each of which vibration is generated in a vibration member by applying a cyclic signal to an electromechanical energy conversion element provided at the vibration member, and a movable member having a friction surface in contact with the vibration member is driven relative to the vibration member by vibration generated in the vibration member, each actuator apparatus being used as a driving source, said drive control method comprising the steps of:

evaluating a condition of the friction surface of a movable member of at least one actuator apparatus of the plurality of actuator apparatuses; and performing a recovery operation by driving at least the one actuator apparatus of the plurality of actuator apparatuses in a predetermined mode to effect a recovery operation of the friction surface of the movable member of the at least one actuator apparatus when it is determined in said evaluating step that the friction surface of the movable member of the at least one actuator apparatus is in a predetermined state.

48. The drive control method according to claim 47, wherein said step of performing a recovery operation comprises driving the at least one actuator apparatus at a speed higher than a predetermined speed or driving the at least one actuator apparatus forward and backward repeatedly.

49. A drive control method for a vibration type actuator apparatus in which vibration is generated in a vibration member by applying a cyclic signal to an electromechanical energy conversion element provided at the vibration member, and a movable member having a friction surface in contact with the vibration member is driven relative to the vibration member by vibration generated in the vibration member, said drive control method comprising the steps of:

driving the actuator by applying a cyclic signal thereto; and performing a recovery operation by driving the movable member relative to the vibration member using a motor provided separately from the actuator apparatus or by hand.

50. A drive control method for an apparatus housing a vibration type actuator in which vibration is generated in a vibration member by applying a cyclic signal to an electromechanical energy conversion element provided at the vibration member, and a movable member having a friction surface in contact with the vibration member is driven relative to the vibration member by vibration generated in the vibration member, said drive control method comprising the steps of:

driving the apparatus by applying a cyclic signal thereto; and monitoring a condition of a contact surface interface between the vibration member and the friction surface of the movable member through a confirmation window in a case housing the vibration type actuator.

51. The drive control method according to claim 47, wherein said step of performing a recovery operation comprises driving the at least one actuator apparatus and at least another one actuator apparatus of the plurality of actuator apparatuses when it is determined in said evaluating step that the friction surface of the movable member of the at least one actuator apparatus is in the predetermined state.

52. The drive control method according to claim 47, wherein said step of performing a recovery operation comprises driving each of the plurality of actuator apparatuses when it is determined in said evaluating step that the friction surface of the movable member of the at least one actuator apparatus is in the predetermined state.

53. The drive control method according to claim 47, wherein said evaluating step comprises evaluating a condition of the friction surface of the movable member of at least another one actuator apparatus of the plurality of actuators apparatuses, and the step of performing a recovery operation comprises driving at least one of the one actuator apparatus and the another one actuator apparatus in the predetermined mode when it is determined in said evaluating step that the friction surface of the movable member of the one actuation apparatus or the another one actuation apparatus is in the predetermined state.

54. The drive control method according to claim 47, wherein said evaluation step comprises evaluating a condition of the friction surface of the movable member of each of the plurality of actuator apparatuses, and wherein said step of performing a recovery operation comprises driving each of the plurality of actuator apparatuses in the predetermined mode when it is determined in said evaluating step that the friction surface of the movable member of any one of the plurality of actuator apparatuses is in the predetermined state.

55. An apparatus using, as a driving source, a vibration type actuator in which vibration is generated in a vibration member by applying a cyclic signal to an electromechanical energy conversion element provided at the vibration member, and a movable member having a friction surface in contact with the vibration member is driven relative to the vibration member by vibration generated in the vibration member, said apparatus comprising:

a signal forming circuit which generates a signal indicating when the vibration actuator requires maintenance.

56. An apparatus according to claim 55, wherein said signal forming circuit includes an evaluation circuit which evaluates a condition of the friction surface of the vibration member, and generates a signal indicating when the vibration actuator requires maintenance based on an evaluation result by the evaluation circuit that the condition of the friction surface is in a predetermined state.

* * * * *

UNITED STATES PATENT AND TRADEMARK OFFICE
CERTIFICATE OF CORRECTION

PATENT NO. : 6,313,564 B1
DATED : November 6, 2001
INVENTOR(S) : Kenichi Kataoka et al.

It is certified that error appears in the above-identified patent and that said Letters Patent is hereby corrected as shown below:

Title page,
Item [56], FOREIGN PATENT DOCUMENTS, "63-174580*7/1998" should read -- 63-174580*7/1988 -- and "10-21-773*7/1998" should read -- 10-210773*8/1998 --.

Item [57], ABSTRACT, line 4, close the right margin.
Line 6, "ating" should read -- ates --.

Column 1,
Line 14, "a an" should read -- an --.
Line 47, "of a" should read -- of the --.

Column 3,
Line 37, "maintained" should read -- is maintained --.

Column 4,
Line 50, "therefor" should read -- therefore --.

Column 6,
Line 28, "adapted" should read -- is adapted --.

Column 8,
Line 15, "not illustrated" should read -- (not illustrated) --.
Line 54, "particle" should read -- particles --.

Column 9,
Line 47, "recovery" should read -- recovery-operations --.

Column 11,
Line 16, "a 301," should be deleted.
Line 42, "section, 317" should read -- section 317, --.
Line 63, "of" should read -- (Of --, and "be a" should read -- be --.
Line 64, "used." should read -- used.) --.

Column 12,
Line 9, "which" should be deleted.

Column 13,
Line 6, "the" (1st occurrence) should be deleted.
Line 25, "arrived," should be deleted.

UNITED STATES PATENT AND TRADEMARK OFFICE
CERTIFICATE OF CORRECTION

PATENT NO. : 6,313,564 B1
DATED : November 6, 2001
INVENTOR(S) : Kenichi Kataoka et al.

It is certified that error appears in the above-identified patent and that said Letters Patent is hereby corrected as shown below:

Column 15,
Line 1, "the fixed" should read -- a fixed --.
Line 11, "with" should read -- by --.
Line 34, "performing a" should be deleted.
Line 36, "recovering" should read -- performing a recovery --.

Column 18,
Line 9, "and a" should read -- and ¶ a --.
Line 40, "member" should read -- member, --.
Line 45, "and a" should read -- and ¶ a --.

Column 19,
Line 7, "actuators" should read -- actuator --.

Column 20,
Line 18, "comprising: evaluating" should read -- comprising: ¶ evaluating --.

Column 22,
Line 23, "actuators" should read -- actuator --.

Signed and Sealed this

Twenty-third Day of April, 2002

Attest:

Attesting Officer

JAMES E. ROGAN
Director of the United States Patent and Trademark Office